United States Patent
Hanada et al.

(10) Patent No.: US 10,270,283 B2
(45) Date of Patent: Apr. 23, 2019

(54) CHARGE/DISCHARGE MANAGEMENT DEVICE

(71) Applicant: TOSHIBA MITSUBISHI-ELECTRIC INDUSTRIAL SYSTEMS CORPORATION, Chuo-ku (JP)

(72) Inventors: Masato Hanada, Tokyo (JP); Daisuke Tsurumaru, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 46 days.

(21) Appl. No.: 15/519,960

(22) PCT Filed: Oct. 21, 2014

(86) PCT No.: PCT/JP2014/077977
§ 371 (c)(1),
(2) Date: Apr. 18, 2017

(87) PCT Pub. No.: WO2016/063355
PCT Pub. Date: Apr. 28, 2016

(65) Prior Publication Data
US 2017/0324268 A1    Nov. 9, 2017

(51) Int. Cl.
*H02J 7/35*    (2006.01)
*H02S 40/32*    (2014.01)
(Continued)

(52) U.S. Cl.
CPC ........ *H02J 7/35* (2013.01); *H02J 3/32* (2013.01); *H02J 3/38* (2013.01); *H02J 3/382* (2013.01);
(Continued)

(58) Field of Classification Search
USPC .................................................. 320/101
See application file for complete search history.

(56) References Cited

FOREIGN PATENT DOCUMENTS

| JP | 2006-287998 A | 10/2006 |
|----|---------------|---------|
| JP | 2012-75224 A  | 4/2012  |

(Continued)

OTHER PUBLICATIONS

International Preliminary Report on Patentability and Written Opinion dated May 4, 2017 in PCT/JP2014/077977.
(Continued)

*Primary Examiner* — Edward Tso
*Assistant Examiner* — Ahmed H Omar
(74) *Attorney, Agent, or Firm* — Oblon, McClelland, Maier & Neustadt, L.L.P.

(57) ABSTRACT

A charge/discharge management device is provided in power generation equipment including a power generation system in which generated power fluctuates and a storage battery system and connected to a power system. The power generation system includes a power meter that detects the generated power. The storage battery system includes a storage battery, a battery management unit that monitors a state of the storage battery, and a power conditioning system. The charge/discharge management device includes a charge/discharge command unit that determines charge/discharge commands for the power conditioning system on the basis of the generated power detected by the power meter and storage battery information supplied from the battery management unit, such that a system supply power change rate is within a fluctuation range of ±n %, and an SoC of the storage battery approaches an SoC target value.

12 Claims, 15 Drawing Sheets

(51) Int. Cl.
*H02J 3/32* (2006.01)
*H02J 3/38* (2006.01)
*H02S 40/38* (2014.01)
*H02J 7/00* (2006.01)

(52) U.S. Cl.
CPC .............. *H02J 3/383* (2013.01); *H02J 7/007* (2013.01); *H02J 7/0072* (2013.01); *H02S 40/32* (2014.12); *H02S 40/38* (2014.12); *Y02E 10/563* (2013.01); *Y02E 10/566* (2013.01); *Y02E 70/30* (2013.01); *Y02P 90/50* (2015.11)

(56) References Cited

FOREIGN PATENT DOCUMENTS

| | | |
|---|---|---|
| JP | 2013-179783 A | 9/2013 |
| JP | 2013-179784 A | 9/2013 |
| JP | 2013-179785 A | 9/2013 |
| JP | 2014-117003 A | 6/2014 |
| WO | 2014/112454 A1 | 7/2014 |

OTHER PUBLICATIONS

Office Action dated Nov. 28, 2017 in Japanese Patent Application No. 2016-554984 (with unedited computer generated English translation).
International Search Report dated Dec. 9, 2014 in PCT/JP2014/077977 filed Oct. 21, 2014.

CHARGE/DISCHARGE MANAGEMENT DEVICE

FIELD

The present invention relates to a charge/discharge management device provided in power generation equipment including a power generation system and a storage battery system.

BACKGROUND

A power system is constructed by connecting power generation equipment and load equipment by a power transmission facility. There are power systems in various scales from a large-scale system connecting a plurality of large-scale power plants and many factories, commercial facilities and households to a small-scale system constructed within a specific facility.

One type of power generation equipment includes a power generation system utilizing natural energy such as sunlight and wind power. The power generation system utilizing the natural energy is being widely introduced in response to rise in awareness of energy problems and environmental problems in recent years. However, the power generation system utilizing the natural energy has a disadvantage that power cannot be stably supplied since generated power tends to be controlled by natural factors such as seasons and weather. In order to make up for the disadvantage, the power generation equipment for which a power generation system and a storage battery system are combined is being considered.

The storage battery system is used as a means for stabilizing power supplied to a power system by the power generation equipment. It was thought before that it is difficult to store a large amount of power, however, since a storage battery of a large capacity such as a lithium-ion battery and sodium-sulfur battery is put into practical use, it is made possible to store the large amount of power. By connecting the storage battery system including such a storage battery to the power generation system, an operation is possible in which excess power is charged in the storage battery when supply is excessive in contrast with power demand, and power insufficiency is compensated by discharge from the storage battery when the supply is insufficient in contrast with the power demand. By combining the storage battery system with the power generation system utilizing the natural energy, the generated power that fluctuates depending on seasons and weather or the like is leveled by charge/discharge of the storage battery, and the power can be stably supplied to the power system.

Note that the applicant recognizes a literature described below as the one associated with the present invention. Patent Literature 1 discloses a configuration that a photovoltaic power generation system and a storage battery system are connected and fluctuation of generated power of photovoltaic power generation is suppressed by charge/discharge control of a storage battery.

CITATION LIST

Patent Literature

[PTL 1] JP 2014-117003 A

SUMMARY

Technical Problem

Now, a service life of a storage battery (lithium-ion battery in particular) changes depending on a held SoC (State of Charge). In the above-described power generation equipment, in order to stabilize power to be supplied to a power system, the storage battery needs to be charged and discharged according to fluctuation of generated power. Therefore, the SoC of the storage battery is not stabilized, and the storage battery is forced to be unreasonably operated affecting a performance and the service life.

The present invention is implemented in order to solve the above-described problems, and an object is to provide a charge/discharge management device provided in power generation equipment including a power generation system in which generated power fluctuates depending on weather and a storage battery system, and capable of stabilizing power to be supplied to a power system connected to the power generation equipment and also suppressing degradation of a storage battery.

Solution to Problem

In order to achieve the above-described object, power generation equipment provided with a charge/discharge management device relating to an embodiment of the present invention is configured as follows.

The charge/discharge management device relating to the embodiment of the present invention is provided in the power generation equipment connected to a power system. The power generation equipment includes a power generation system in which generated power fluctuates depending on weather and a storage battery system. The charge/discharge management device relating to the embodiment of the present invention may be incorporated in the power generation system or the storage battery system. A scale and a configuration of the power generation equipment and the power system are not limited.

The power generation system in which the generated power fluctuates depending on weather is a photovoltaic power generation system or a wind power generation system for example. The power generation system includes a power meter which detects the generated power.

The storage battery system includes a storage battery, a battery management unit, and a power conditioning system. The storage battery may be configured by a single storage battery cell or may be configured as an assembly of a plurality of storage battery cells. As a kind of the storage battery, the storage battery of a large capacity such as a lithium-ion battery, a sodium-sulfur battery or a nickel-hydrogen battery is preferable.

The battery management unit is a device that monitors a state of the storage battery. Examples of monitoring items by the battery management unit are state amounts of a current, a voltage and a temperature or the like. The battery management unit measures the state amount which is the monitoring item at all times or in a predetermined cycle by a sensor, and outputs a part or all of obtained data to outside as storage battery information.

The power conditioning system is a device that connects the storage battery to the power generation system, and has a function of converting AC power outputted by the power generation system to DC power and charging the DC power to the storage battery and a function of converting the DC power of the storage battery to the AC power and discharging the AC power to the power system. The power conditioning system is also referred to as a power conditioner, and a charge power amount to the storage battery and a discharge power amount from the storage battery are adjusted by the power conditioning system.

The charge/discharge management device relating to the embodiment of the present invention is connected to the power meter, the battery management unit, and the power conditioning system. The charge/discharge management device includes a charge/discharge command unit. The charge/discharge command unit determines charge/discharge commands for the power conditioning system on the basis of generated power detected by the power meter and the storage battery information supplied from the battery management unit, such that a change rate per unit time of power supplied to the power system to rated power (a rated value) (hereinafter, simply described also as "system supply power change rate") is within a fluctuation range of ±n %, and the SoC of the storage battery approaches an SoC target value. The rated power is, for example, the rated power of the power generation equipment or the power generation system, and a previous measured value by the power meter may be used.

The SoC means a charge rate to full charge of the storage battery. The SoC is included in the storage battery information supplied from the battery management unit. Note that the SoC can be calculated from an integrated value of a current flowing to the storage battery. Note that, since a voltage and the SoC are correlated, the SoC may be calculated using a predetermined relational map or a relational expression from the voltage. The SoC target value is preferably set at an ideal value suitable for suppressing degradation of the storage battery. In addition, since the voltage and the SoC are correlated, the SoC may be replaced with the voltage and the SoC target value may be replaced with a voltage target value.

In a preferable mode of the charge/discharge management device relating to the present invention, the charge/discharge command unit determines the charge/discharge command to increase charge power or decrease discharge power more than the previous charge/discharge command such that the system supply power change rate is −n % or higher and below 0%, in the case that the SoC is lower than the SoC target value and the change rate per unit time of the generated power detected by the power meter to the rated power (hereinafter, simply described also as "generated power change rate") is +n % or higher. Preferably, the charge/discharge command is determined to increase the charge power or decrease the discharge power more than the previous charge/discharge command such that the system supply power change rate is −n %.

In addition, the charge/discharge command unit determines the charge/discharge command to increase the discharge power or decrease the charge power more than the previous charge/discharge command such that the system supply power change rate is −n % or higher and below 0%, in the case that the SoC is lower than the SoC target value and the generated power change rate is −n % or lower. Preferably, the charge/discharge command is determined to increase the discharge power or decrease the charge power more than the previous charge/discharge command such that the system supply power change rate is −n %.

In addition, the charge/discharge command unit determines the charge/discharge command to increase the charge power or decrease the discharge power more than the previous charge/discharge command such that the system supply power change rate is −n % or higher and below 0%, in the case that the SoC is lower than the SoC target value and the generated power change rate is higher than −n % and lower than +n %. Preferably, the charge/discharge command is determined to increase the charge power or decrease the discharge power more than the previous charge/discharge command such that the system supply power change rate is −n %.

In addition, the charge/discharge command unit determines the charge/discharge command to increase the charge power or decrease the discharge power more than the previous charge/discharge command such that the system supply power change rate is higher than 0% and +n % or lower, in the case that the SoC is higher than the SoC target value and the generated power change rate is +n % or higher. Preferably, the charge/discharge command is determined to increase the charge power or decrease the discharge power more than the previous charge/discharge command such that the system supply power change rate is +n %.

In addition, the charge/discharge command unit determines the charge/discharge command to increase the discharge power or decrease the charge power more than the previous charge/discharge command such that the system supply power change rate is higher than 0% and +n % or lower, in the case that the SoC is higher than the SoC target value and the generated power change rate is −n % or lower. Preferably, the charge/discharge command is determined to increase the discharge power or decrease the charge power more than the previous charge/discharge command such that the system supply power change rate is +n %.

In addition, the charge/discharge command unit determines the charge/discharge command to increase the discharge power or decrease the charge power more than the previous charge/discharge command such that the system supply power change rate is higher than 0% and +n % or lower, in the case that the SoC is higher than the SoC target value and the generated power change rate is higher than −n % and lower than +n %. Preferably, the charge/discharge command is determined to increase the discharge power or decrease the charge power more than the previous charge/discharge command such that the system supply power change rate is +n %.

Advantageous Effects of Invention

According to the charge/discharge management device relating to the embodiment of the present invention, since power to be supplied to a power system connected to power generation equipment including a power generation system in which generated power fluctuates depending on weather and a storage battery system can be stabilized and the SoC of a storage battery can be made to approach an SoC target value, a storage battery capacity to be needed can be compressed, and the degradation of the storage battery can be suppressed.

DESCRIPTION OF EMBODIMENTS

Hereinafter, embodiments of the present invention will be described in details with reference to the drawings. Note that same signs are attached to elements in common in the respective diagrams and redundant descriptions are omitted.

Embodiment 1

[Entire Configuration of Embodiment 1]

Figure 1:
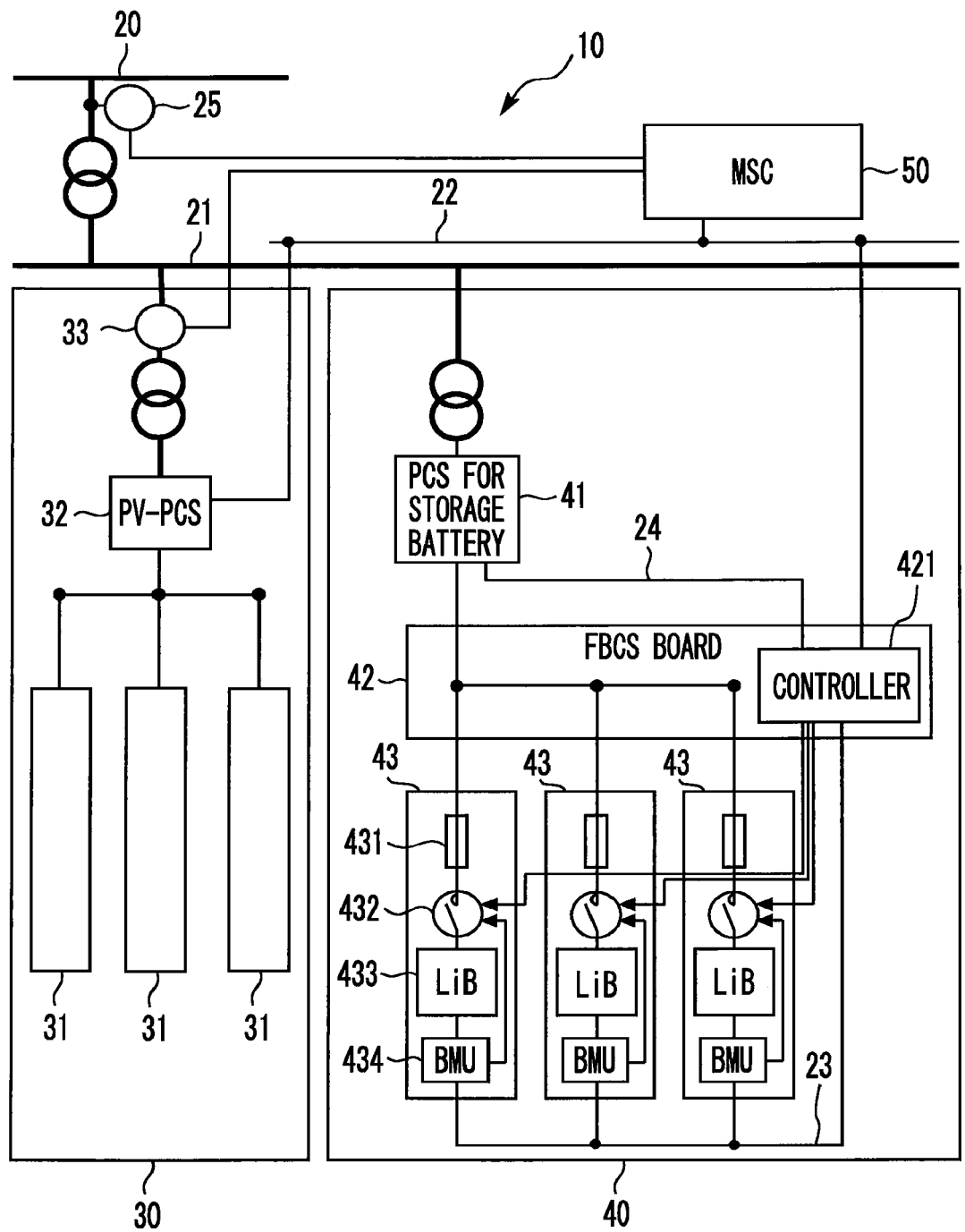
FIG. 1 is a conceptual configuration diagram for describing a system configuration relating to an embodiment 1 of the present invention.

FIG. 1 is a conceptual configuration diagram for describing a system configuration relating to the embodiment 1 of the present invention. Power generation equipment 10 illustrated in FIG. 1 is connected to a power transmission facility 20 of a power system. The power system includes, other than the power transmission facility 20, the other power generation equipment (omitted in the figure) connected to the power transmission facility 20, and load equipment (omitted in the figure) connected to the power transmission facility 20. The power generation equipment 10 includes a power generation system 30 in which generated power fluctuates depending on weather and a storage battery system 40. The power generation system 30 and the storage battery system 40 are connected through an intra-equipment electric wire 21. Further, the power generation equipment 10 includes a main site controller (MSC) 50. The power generation system 30, the storage battery system 40 and the main site controller 50 are connected through a computer network 22. On a linking point of the power generation equipment 10 and the power system, a power meter 25 is provided. The power meter 25 is connected to the main site controller 50 by a signal line.

(Power Generation System)

The power generation system 30 illustrated in FIG. 1 is a photovoltaic power generation (PV) system. Note that the power generation system 30 may be a wind power generation system or the like. The power generation system 30 includes a photovoltaic power generation module 31, a power conditioning system for photovoltaic power generation (hereinafter, PV-PCS) 32, and a power meter 33. In the power generation system 30, the plurality of photovoltaic power generation modules 31 are connected to one PV-PCS 32. In FIG. 1, there are three photovoltaic power generation modules 31, but it is just one example. The PV-PCS 32 is connected through the power meter 33 to the intra-equipment electric wire 21. The power meter 33 is connected to the main site controller 50 by a signal line.

The power meter 33 detects the generated power supplied from the power generation system 30 to the intra-equipment electric wire 21 regularly. However, regular detection in the present embodiment is a concept including not only an operation of fetching continuous signals without an interval from a sensor but also an operation of fetching signals of the sensor in a predetermined short cycle. A generated power value detected in the power meter 33 is inputted to the main site controller 50.

(Storage Battery System)

The storage battery system 40 includes a power conditioning system for the storage battery (hereinafter, a PCS for storage battery) 41, a front battery control station board (hereinafter, FBCS board) 42, and a storage battery board 43. In the storage battery system 40, one FBCS board 42 is connected to one PCS for storage battery 41, and the plurality of storage battery boards 43 are connected in parallel to one FBCS board 42. In FIG. 1, there are three columns of the storage battery boards 43, but it is just one example. A parallel number of the storage battery boards 43 is determined on the basis of specifications of the PCS for storage battery 41. Therefore, it is possible that the parallel number of the storage battery board 43 is one.

((Storage Battery Board))

The storage battery board 43 includes a fuse 431, a contactor 432, a storage battery module 433, and a battery management unit (hereinafter, BMU: Battery Management Unit) 434. The storage battery module 433 is a module in which a plurality of cells are connected in series. Each cell is a lithium-ion battery (LiB). The storage battery module 433 is connected to the FBCS board 42 by a power transmission line through the contactor 432 and the fuse 431. In addition, the storage battery module 433 is connected to the BMU 434 by a signal line. The BMU 434 is connected to a controller 421 on the FBCS board 42 by a computer network 23, and is connected to the contactor 432 by a signal line.

The BMU 434 monitors a state of the storage battery module 433. Specifically, the BMU 434 includes a current sensor, a voltage sensor, and a temperature sensor as means for measuring a state amount of the storage battery module 433. A current flowing to the storage battery module 433 is measured by the current sensor. A voltage of each cell is measured by the voltage sensor. Then, a temperature of the storage battery module 433 is measured by the temperature sensor. The storage battery module 433 is regularly monitored by the BMU 434. However, regular monitoring in the present embodiment is the concept including not only the operation of fetching the continuous signals without an interval from the sensor but also the operation of fetching the signals of the sensor in a predetermined short cycle. The BMU 434 transmits storage battery information including information obtained by measurements by the respective sensors to the controller 421.

The contactor 432 is disposed between the fuse 431 and the storage battery module 433. When the contactor 432 receives a close signal, a contact is turned ON and closed. In addition, when the contactor 432 receives an open signal, the contact is turned OFF and opened. For example, the close signal is a current of a predetermined value [A] or higher, and the open signal is a current below the predetermined value [A]. The PCS for storage battery 41 and the storage battery module 433 are electrically connected by closing of the contactor 432, and the electric connection of the PCS for storage battery 41 and the storage battery module 433 is cut off by opening of the contactor 432.

((FBCS Board))

The FBCS board 42 is connected to the storage battery board 43 and the PCS for storage battery 41. Specifically, each storage battery board 43 is connected to the FBCS board 42 by an individual power transmission line. The individual power transmission lines are joined inside the FBCS board 42 and connected to a thicker power transmission line. The joined power transmission line is connected to the PCS for storage battery 41. In addition, the FBCS board 42 includes the controller 421. The controller 421 includes a memory including a ROM and a RAM or the like for example, an input/output interface that inputs and outputs various kinds of information, and a processor capable of executing various kinds of arithmetic processing on the basis of the various kinds of information. The controller 421 is connected to the MSC 50 through the computer network 22, to the BMU 434 through the computer network 23, and to the PCS for storage battery 41 through a computer network 24. In addition, the controller 421 is connected to the contactor 432 by a signal line.

The controller 421 issues charge/discharge commands to the PCS for storage battery 41. The charge/discharge commands include requests regarding valid power and invalid power to be charged and discharged by the PCS for storage battery 41. The charge/discharge commands are determined by a charge/discharge command unit 61 to be described later. In addition, the controller 421 has a function of outputting a trip command to the PCS for storage battery 41, and a function of closing/opening the contactor 432, or the like.

((PCS for Storage Battery))

The PCS for storage battery 41 is connected to the intra-equipment electric wire 21 by a power transmission line through a transformer. The PCS for storage battery 41 has a charge function of converting AC power outputted by the power generation system 30 to DC power and charging the DC power to the storage battery module 433, and a discharge function of converting the DC power of the storage battery module 433 to the AC power and discharging the AC power to the power system. A charge power amount to the storage battery module 433 and a discharge power amount from the storage battery module 433 are adjusted by the PCS for storage battery 41. The adjustment of charge/discharge power amount by the PCS for storage battery 41 is performed according to the charge/discharge commands supplied from the controller 421. The PCS for storage battery 41 includes a current sensor and a voltage sensor, and the PCS for storage battery 41 refers to output values of the sensors and executes adjustment of the charge/discharge power amounts.

(Main Site Controller)

The main site controller 50 includes a memory including a ROM and a RAM or the like for example, an input/output interface that inputs and outputs various kinds of information, and a processor capable of executing various kinds of arithmetic processing on the basis of the various kinds of information. The main site controller 50 is connected to the PV-PCS 32 and the controller 421 by the computer network 22. The main site controller 50 is connected to the power meter 33 by a signal line.

The main site controller 50 controls electric power supply/demand between the power system and the power generation equipment 10. For example, the main site controller 50 has a charge/discharge command function to be described later, and a PV-PCS output suppression function of suppressing output of the power generation system 30 in the case that the storage battery module 433 is in a full charge state.

The power meter 25 regularly detects combined power supplied from the power generation equipment 10 to the power system. The combined power is the power for which the generated power of the power generation system 30 and charge/discharge power of the storage battery system 40 are added up. However, regular detection in the present embodiment is the concept including not only the operation of fetching the continuous signals without an interval from the sensor but also the operation of fetching the signals of the sensor in a predetermined short cycle. A combined power value detected in the power meter 25 is inputted to the main site controller 50.

[Characteristic Configuration of Embodiment 1]

Figure 2:
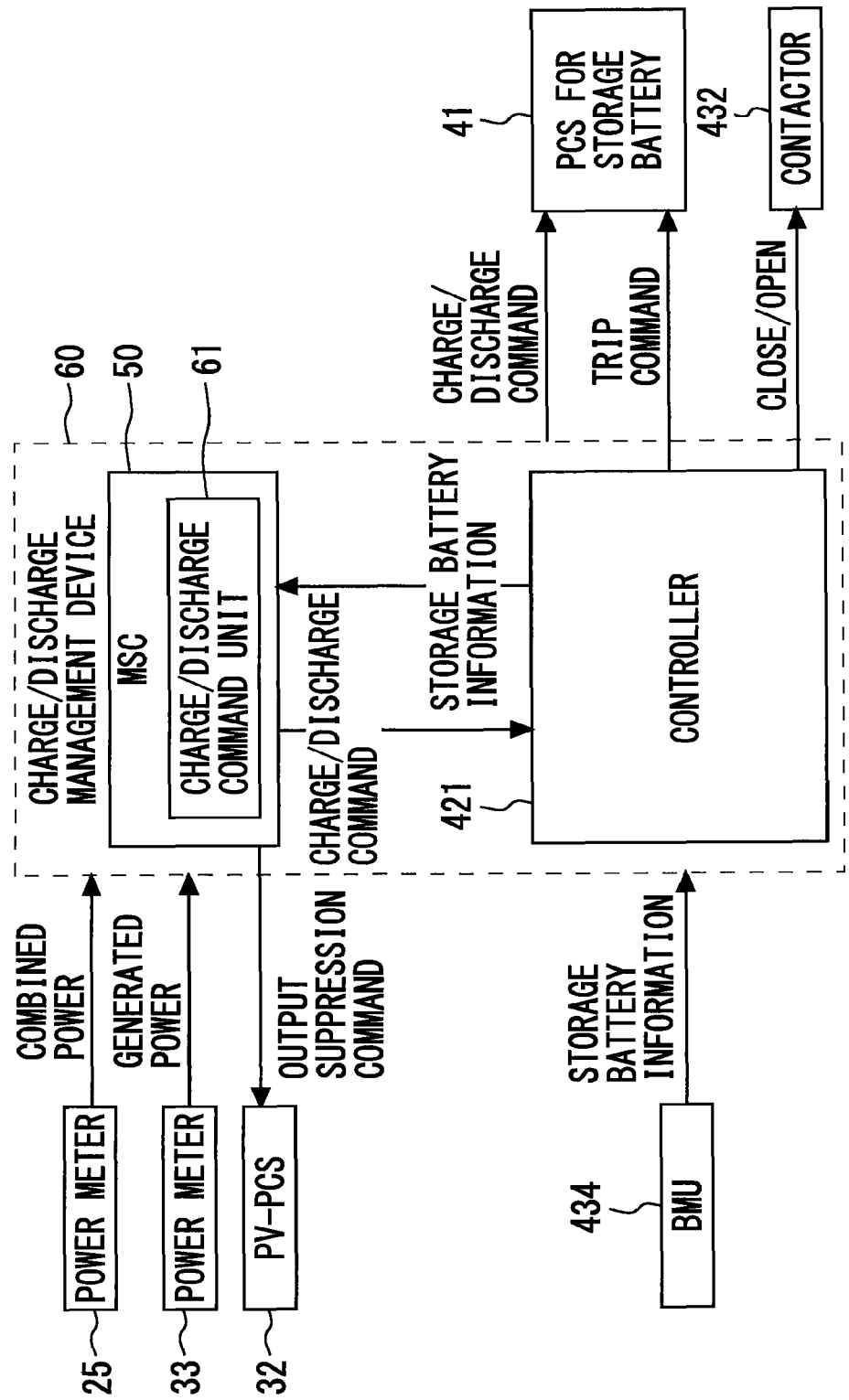
FIG. 2 is a block diagram of a system relating to the embodiment 1 of the present invention.

FIG. 2 is a block diagram of a system relating to the embodiment 1 of the present invention. A charge/discharge management device 60 is a concept that may include the main site controller 50 and the controller 421.

Inside a block indicating the main site controller 50, a part of various functions that the main site controller 50 has is expressed by a block. An arithmetic resource is allocated to each of the blocks. Programs corresponding to the respective blocks are prepared in the main site controller 50, and by executing them by the processor, the functions of the respective blocks are realized in the main site controller 50.

Similarly, inside a block indicating the controller 421, a part of various functions that the controller 421 has is expressed by a block. An arithmetic resource is allocated to each of the blocks. Programs corresponding to the respective blocks are prepared in the controller 421, and by executing them by the processor, the functions of the respective blocks are realized in the controller 421.

(Charge/Discharge Command Function)

The charge/discharge management device 60 has the charge/discharge command function, and the charge/discharge command unit 61 is in charge of the function. The charge/discharge management device 60 receives the combined power value from the power meter 25, receives the generated power value from the power meter 33, and receives the storage battery information from the BMU 434. The charge/discharge command unit 61 determines the charge/discharge command on the basis of the generated power value and the storage battery information, and transmits the charge/discharge command to the PCS for storage battery 41.

Figure 3:
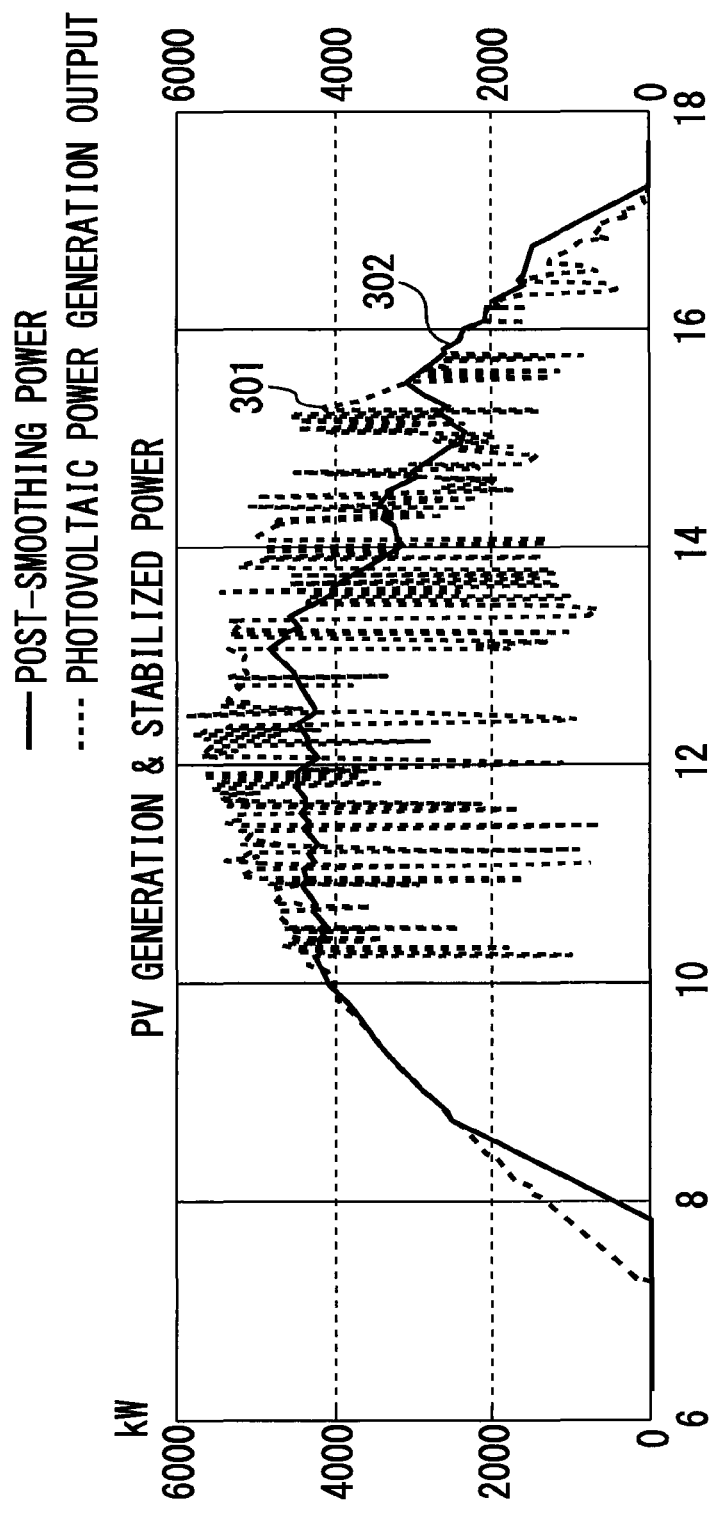
FIG. 3 is a diagram for describing fluctuation and leveling of generated power of a photovoltaic power generation system.

FIG. 3 is a diagram for describing fluctuation of the generated power at each time by a photovoltaic power generation system. The photovoltaic power generation system is used as the power generation system 30 in FIG. 1. Output of the photovoltaic power generation system fluctuates depending on an amount of solar radiation. It is typical in the case that clouds flow in a clear sky, and the output rapidly fluctuates in a short time while shadows of the clouds pass through on solar panels. Steep fluctuation needs to be leveled by making the storage battery system 40 perform charge and discharge so as to cancel the output fluctuation of photovoltaic power generation.

In an example illustrated in FIG. 3, by making the storage battery system 40 perform charge and discharge so as to cancel the output of the photovoltaic power generation system illustrated by a broken line 301, the output fluctuation is mitigated as a solid line 302. The charge/discharge command unit 61 determines the charge/discharge command so as to level the steep output fluctuation of the photovoltaic power generation by charge/discharge control of the storage battery.

In the present embodiment, the SoC means a charge rate to full charge of the storage battery. The SoC is included in the storage battery information supplied from the battery management unit 434. Note that the SoC can be calculated from an integrated value of the current flowing to the storage battery. In addition, the lithium-ion battery has a characteristic that the voltage is higher as it is fully charged and the voltage becomes lower as it is nearly empty. BY utilizing the voltage-SoC characteristic, the SoC can be also calculated from a measured value of the voltage. The voltage in the present embodiment means the voltage applied to both ends of the storage battery module 433.

A service life of the storage battery module 433 changes depending on the held voltage, that is, the held SoC. In order to suppress degradation of the storage battery module 433, it is desirable to maintain the voltage of the storage battery module 433 within an appropriate held voltage range. The held voltage is the voltage capable of suppressing the degradation of the storage battery most, and is different for each kind of the storage battery. The held voltage range is a range suitable for suppressing the degradation of the storage battery module 433 centering on the held voltage, and is set beforehand.

Then, the charge/discharge command unit 61 in the embodiment 1 of the present invention determines the charge/discharge command capable of stabilizing the power to be supplied to the power system by leveling the generated power, and suppressing the degradation of the storage battery module 433.

The charge/discharge command unit 61 determines the charge/discharge command for the power conditioning system 41 on the basis of the generated power detected by the power meter 33 and the storage battery information supplied from the battery management unit 434, such that a change rate of the power supplied to the power system to rated power (a rated value) (hereinafter, simply described as "system supply power change rate") is within a fluctuation range of ±n %/minute, and the SoC of the storage battery module 433 approaches an SoC target value. The charge/discharge command is determined for every predetermined control interval. The SoC target value is the SoC corresponding to the held voltage described above.

Specifically, the charge/discharge command unit 61 determines the charge/discharge command to increase the charge power or decrease the discharge power more than the previous charge/discharge command such that the system supply power change rate is −n %/minute or higher and below 0%/minute, in the case that the SoC is lower than the SoC target value and the change rate of the generated power detected by the power meter to the rated power (hereinafter, simply described as "generated power change rate") is +n %/minute or higher. Preferably, the charge/discharge command is determined to increase the charge power or decrease the discharge power more than the previous charge/discharge command such that the system supply power change rate is −n %/minute.

In addition, the charge/discharge command unit 61 determines the charge/discharge command to increase the discharge power or decrease the charge power more than the previous charge/discharge command such that the system supply power change rate is −n %/minute or higher and below 0%/minute, in the case that the SoC is lower than the SoC target value and the generated power change rate is −n %/minute or lower. Preferably, the charge/discharge command is determined to increase the discharge power or decrease the charge power more than the previous charge/discharge command such that the system supply power change rate is −n %/minute.

In addition, the charge/discharge command unit 61 determines the charge/discharge command to increase the charge power or decrease the discharge power more than the previous charge/discharge command such that the system supply power change rate is −n %/minute or higher and below 0%/minute, in the case that the SoC is lower than the SoC target value and the generated power change rate is higher than −n %/minute and lower than +n %/minute. Preferably, the charge/discharge command is determined to increase the charge power or decrease the discharge power more than the previous charge/discharge command such that the system supply power change rate is −n %/minute.

In addition, the charge/discharge command unit 61 determines the charge/discharge command to increase the charge power or decrease the discharge power more than the previous charge/discharge command such that the system supply power change rate is higher than 0%/minute and +n %/minute or lower, in the case that the SoC is higher than the SoC target value and the generated power change rate is +n %/minute or higher. Preferably, the charge/discharge command is determined to increase the charge power or decrease the discharge power more than the previous charge/discharge command such that the system supply power change rate is +n %/minute.

In addition, the charge/discharge command unit 61 determines the charge/discharge command to increase the discharge power or decrease the charge power more than the previous charge/discharge command such that the system supply power change rate is higher than 0%/minute and +n %/minute or lower, in the case that the SoC is higher than the SoC target value and the generated power change rate is −n %/minute or lower. Preferably, the charge/discharge command is determined to increase the discharge power or decrease the charge power more than the previous charge/discharge command such that the system supply power change rate is +n %/minute.

In addition, the charge/discharge command unit 61 determines the charge/discharge command to increase the discharge power or decrease the charge power more than the previous charge/discharge command such that the system supply power change rate is higher than 0%/minute and +n %/minute or lower, in the case that the SoC is higher than the SoC target value and the generated power change rate is higher than −n %/minute and lower than +n %/minute. Preferably, the charge/discharge command is determined to increase the discharge power or decrease the charge power more than the previous charge/discharge command such that the system supply power change rate is +n %/minute.

Note that, in FIG. 2, the charge/discharge command unit 61 is arranged in the main site controller 50, however, the arrangement of the charge/discharge command unit 61 is not limited thereto. The charge/discharge command unit 61 may be arranged in the controller 421. In this case, the generated power amount detected by the power meter 33 is transmitted to the controller 421 through the main site controller 50 or directly.

(Flowchart)

Figure 4:
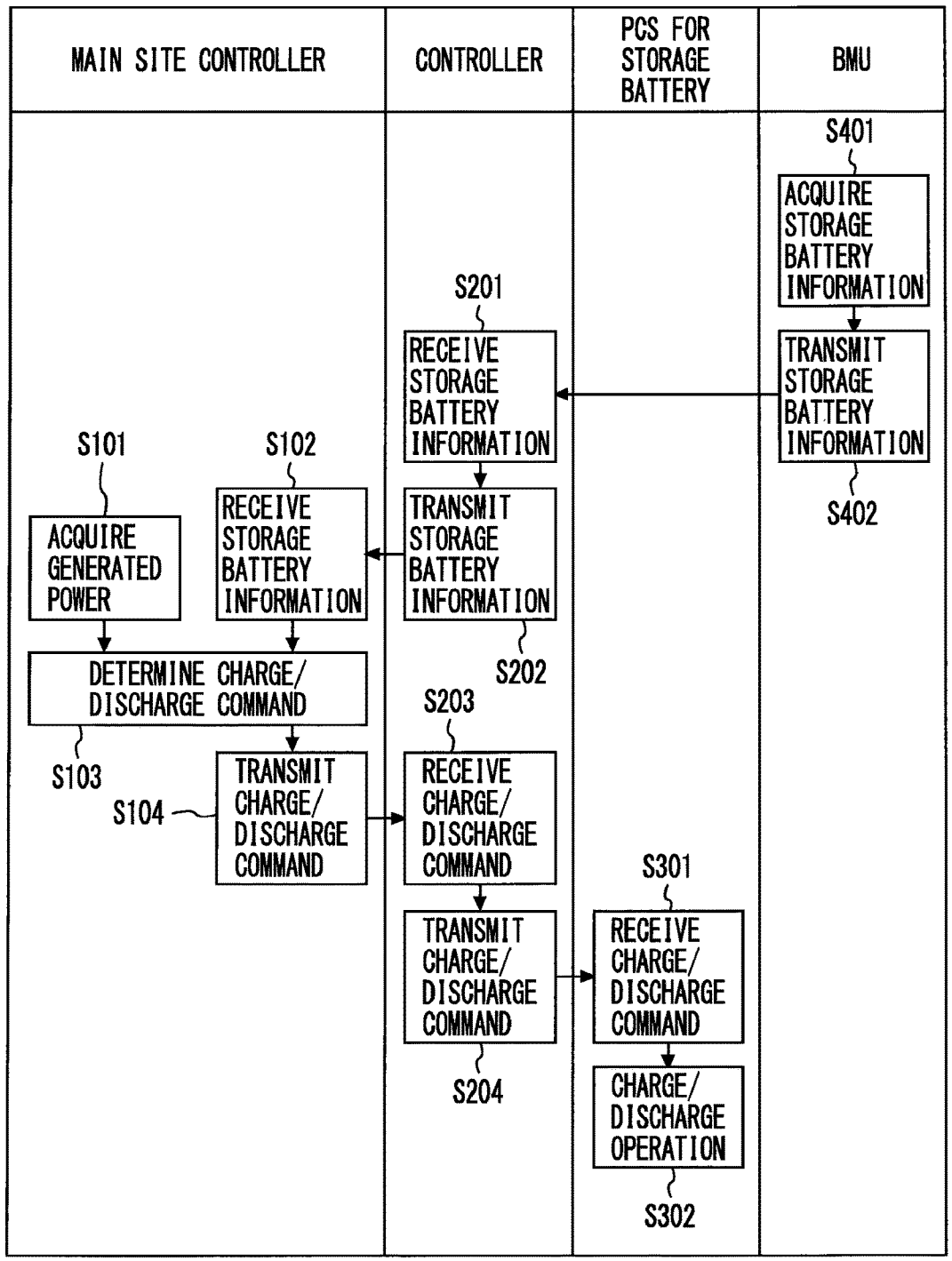
FIG. 4 is a flowchart of a control routine executed by a charge/discharge management device 60, in the system relating to the embodiment 1 of the present invention.

FIG. 4 is a flowchart of a control routine executed by the charge/discharge management device 60, in the system relating to the embodiment 1 of the present invention. Processing of the main site controller 50 illustrated in the flowchart is the processing realized by the function of the charge/discharge command unit 61. The program that executes the processing in the flowchart illustrated in FIG. 4 is stored in the memory of the main site controller 50, and by reading and executing the program by the processor of the main site controller 50, the processing illustrated in FIG. 4 is realized.

The power meter 33 regularly detects the generated power supplied from the power generation system 30 to the intra-equipment electric wire 21. In the routine illustrated in FIG. 4, the main site controller 50 acquires the generated power value from the power meter 33 in a predetermined short cycle (for example, an interval of several tens of milliseconds) (step S101).

On the other hand, the BMU 434 acquires the storage battery information in the predetermined short cycle (for example, the interval of several tens of milliseconds) using the various kinds of sensors described above (step S401). The storage battery information includes the current flowing to the storage battery module 433, the voltage of each cell, and the temperature of the storage battery module 433. Thereafter, the BMU 434 transmits the acquired storage battery information to the controller 421 (step S402).

The controller 421 receives the storage battery information transmitted from the BMU 434 (step S201). The controller 421 transmits the received storage battery information to the main site controller 50 (step S202).

The main site controller 50 receives the storage battery information transmitted from the controller 421 (step S102). After the processing of step S101 and step S102, the charge/discharge command unit 61 determines the charge/discharge command for the power conditioning system on the basis of the generated power acquired in step S101 and the storage battery information received in step S102, such that the system supply power change rate is within a fluctuation range of ±n %/minute, and the SoC of the storage battery approaches the SoC target value (step S103). Note that a power change amount per unit time changes corresponding to a control interval. Note that, in the case that the control interval is 20 msec, the power change amount per control needs to be controlled to be within a range of 1/3000 of ±n %.

Figure 5:
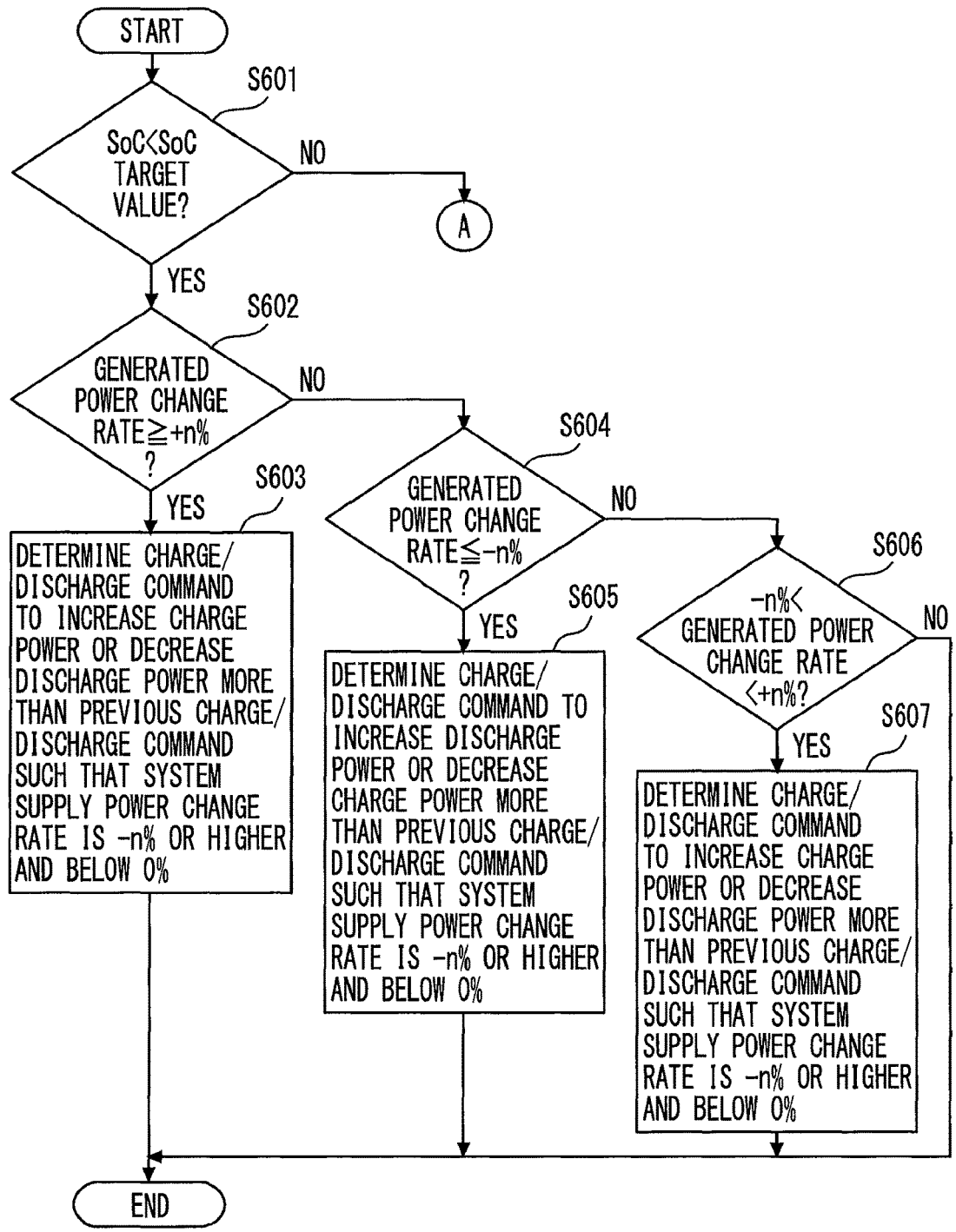
FIG. 5 is a flowchart of a charge/discharge command determination routine executed by a charge/discharge command unit 61 in step S103.
Figure 6:
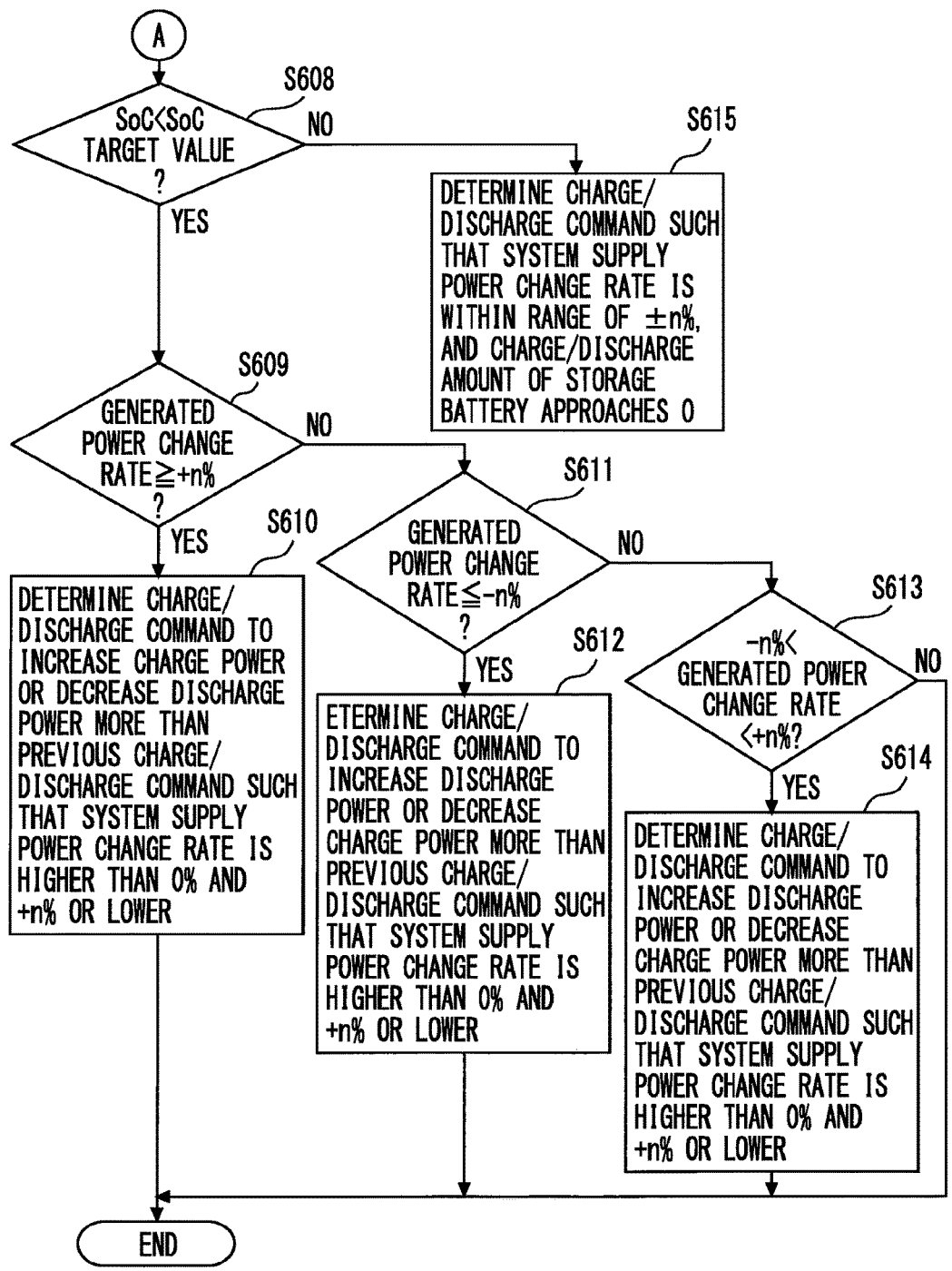
FIG. 6 is a flowchart of the charge/discharge command determination routine executed by the charge/discharge command unit 61 in step S103.

The specific processing in step S103 will be described using FIG. 5 and FIG. 6. FIG. 5 and FIG. 6 are flowcharts of a charge/discharge command determination routine executed by the charge/discharge command unit 61 in step S103.

In the routine illustrated in FIG. 5, the charge/discharge command unit 61 first determines whether the SoC of the storage battery module 433 is lower than the SoC target value on the basis of the storage battery information (step S601).

In the case that the SoC is lower than the SoC target value, the charge/discharge command unit 61 then determines whether the generated power change rate is +n %/minute or higher (step S602). In the case that a determination condition in step S602 is established, the charge/discharge command unit 61 determines the charge/discharge command to increase the charge power or decrease the discharge power more than the previous charge/discharge command such that the system supply power change rate is −n %/minute or higher and below 0%/minute (step S603). Preferably, the charge/discharge command is determined to increase the charge power or decrease the discharge power more than the previous charge/discharge command such that the system supply power change rate is −n %/minute.

In the case that the determination condition in step S602 is not established, the charge/discharge command unit 61 then determines whether the generated power change rate is −n %/minute or lower (step S604). In the case that the determination condition in step S604 is established, the charge/discharge command unit 61 determines the charge/discharge command to increase the discharge power or decrease the charge power more than the previous charge/discharge command such that the system supply power change rate is −n %/minute or higher and below 0%/minute (step S605). Preferably, the charge/discharge command is determined to increase the discharge power or decrease the charge power more than the previous charge/discharge command such that the system supply power change rate is −n %/minute.

In the case that the determination condition in step S604 is not established, the charge/discharge command unit 61 then determines whether the generated power change rate is higher than −n %/minute and lower than +n %/minute (step S606). In the case that the determination condition in step S606 is established, the charge/discharge command unit 61 determines the charge/discharge command to increase the charge power or decrease the discharge power more than the previous charge/discharge command such that the system supply power change rate is −n %/minute or higher and below 0%/minute (step S607). Preferably, the charge/discharge command is determined to increase the charge power or decrease the discharge power more than the previous charge/discharge command such that the system supply power change rate is −n %/minute.

In addition, in the case that the determination condition in step S601 is not established, the charge/discharge command unit 61 determines whether the SoC of the storage battery module 433 is higher than the SoC target value (FIG. 6, step S608).

In the case that the SoC is higher than the SoC target value, the charge/discharge command unit 61 then determines whether the generated power change rate is +n %/minute or higher (step S609). In the case that the determination condition in step S609 is established, the charge/discharge command unit 61 determines the charge/discharge command to increase the charge power or decrease the discharge power more than the previous charge/discharge command such that the system supply power change rate is higher than 0%/minute and +n %/minute or lower (step S610). Preferably, the charge/discharge command is determined to increase the charge power or decrease the discharge power more than the previous charge/discharge command such that the system supply power change rate is +n %/minute.

In the case that the determination condition in step S609 is not established, the charge/discharge command unit 61 then determines whether the generated power change rate is −n %/minute or lower (step S611). In the case that the determination condition in step S611 is established, the charge/discharge command unit 61 determines the charge/discharge command to increase the discharge power or decrease the charge power more than the previous charge/ discharge command such that the system supply power change rate is higher than 0%/minute and +n %/minute or lower (step S612). Preferably, the charge/discharge command is determined to increase the discharge power or decrease the charge power more than the previous charge/discharge command such that the system supply power change rate is +n %/minute.

In the case that the determination condition in step S611 is not established, the charge/discharge command unit 61 then determines whether the generated power change rate is higher than −n %/minute and lower than +n %/minute (step S613). In the case that the determination condition in step S613 is established, the charge/discharge command unit 61 determines the charge/discharge command to increase the discharge power or decrease the charge power more than the previous charge/discharge command such that the system supply power change rate is higher than 0%/minute and +n %/minute or lower (step S614). Preferably, the charge/discharge command is determined to increase the discharge power or decrease the charge power more than the previous charge/discharge command such that the system supply power change rate is +n %/minute.

In addition, in the case that the determination conditions in step S601 and step S608 are not established, that is, in the case that the SoC is equal to the SoC target value, the charge/discharge command unit 61 determines the charge/discharge command such that the system supply power change rate is within the range of ±n %, and the charge/discharge amount of the storage battery module 433 approaches 0 (step S615).

Returning to FIG. 4, the processing of step S104 and thereafter will be described. After the processing of step S103, the main site controller 50 transmits the charge/discharge command to the controller 421 (step S104).

The controller 421 receives the charge/discharge command transmitted from the main site controller 50 (step S203). The controller 421 transmits the received charge/discharge command to the PCS for storage battery 41 (step S204).

The PCS for storage battery 41 receives the charge/discharge command transmitted from the controller 421 (step S301). The PCS for storage battery 41 executes a charge/discharge operation according to the charge/discharge command (step S302).

As described above, the charge/discharge management device 60 of the present embodiment determines the charge/discharge command such that the change rate of the power supplied to the power system is controlled to be within the range of ±n %/minute by leveling the fluctuation of the generated power and the SoC of the storage battery module 433 approaches the SoC target value at maximum. Therefore, according to the charge/discharge management device 60 of the present embodiment, since the power supplied to the power system can be stabilized and the SoC of the storage battery module 433 can be made to approach the SoC target value, a storage battery capacity to be needed can be compressed, and the degradation of the storage battery can be suppressed.

Embodiment 2

[Entire Configuration of Embodiment 2]

Next, the embodiment 2 of the present invention will be described with reference to FIG. 7 to FIG. 11. The system of the present embodiment can be realized by making the charge/discharge management device 60 execute the routine in FIG. 11 to be described later, in the configuration illustrated in FIG. 1 and FIG. 10.

[Characteristic Control in Embodiment 2]

In the above-described embodiment 1, the SoC target value is set at the ideal value suitable for suppressing the degradation of the storage battery. However, when fixed control is performed to the ideal SoC suitable for suppressing the degradation of the storage battery, the capacity of the storage battery to be required becomes large. For example, in the storage battery for which the SoC ideal for suppressing the degradation is 30%, in the case of performing the control so that the SoC is always 30%, when it is assumed that 3 MWh is required for suppressing the fluctuation of a PV power generation amount, the required capacity of the storage battery is 10 MWh.

Figure 7:
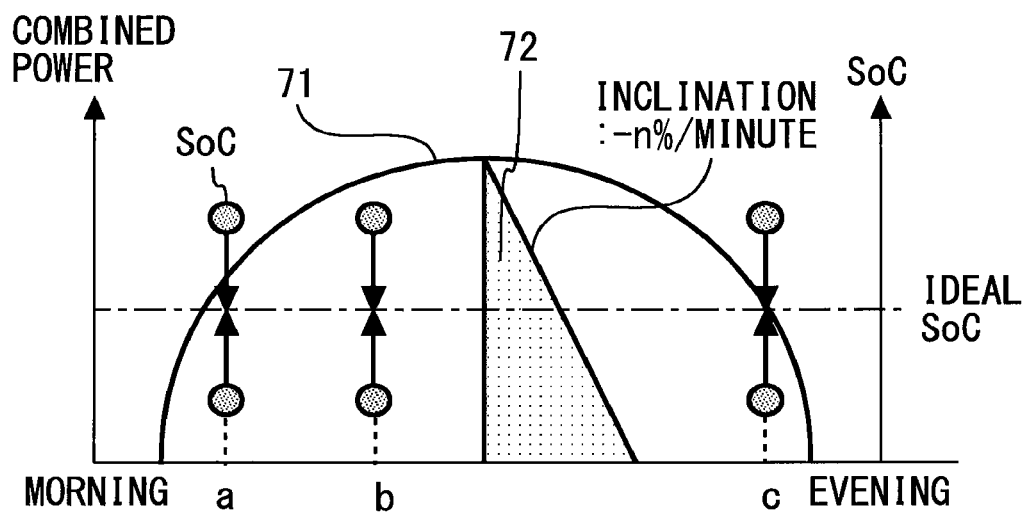
FIG. 7 is a diagram for describing a relation between a change of a PV power generation amount in one day and a required storage battery capacity.

FIG. 7 is a diagram for describing a relation between a change of the combined power in one day and a required storage battery capacity. Note that the combined power illustrated in FIG. 7 is the power for which the generated power (PV generated power) of the photovoltaic power generation system and the charge/discharge power by the storage battery system are combined. In FIG. 7, an example that the combined power in one day changes as illustrated by a solid line 71 is illustrated, however, the combined power at each time fluctuates due to the change of the weather or the like in one day, and it is not limited to the change illustrated by the solid line 71. In the case of assuming that the generated power of the photovoltaic power generation system suddenly becomes 0, a power amount required for changing the power supplied to the power system to 0 [kW] while discharging the storage battery so that the system supply power change rate does not become below −n %/minute (hereinafter, simply described as "required power amount") is indicated by an area of a region 72 at solar radiation peak time. The required power amount changes according to the change in one day of the combined power. As illustrated in FIG. 7, when the SoC target value is fixed to the SoC ideal for suppressing the degradation of the storage battery, the above-described required power amount cannot be secured sometimes. Therefore, in the system of the embodiment 2, the SoC target value is changed according to the change in one day of the required power amount.

Figure 8:
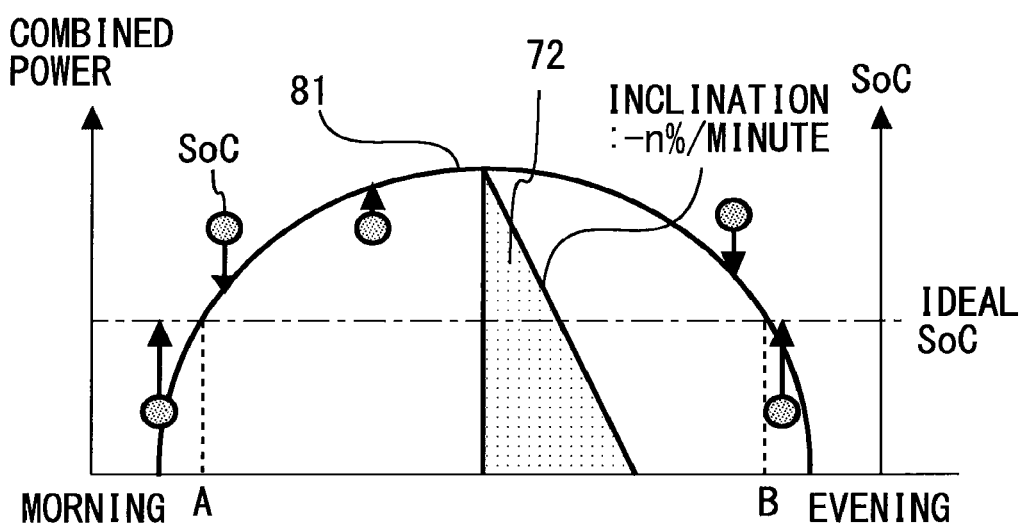
FIG. 8 is a diagram for describing scheduling of an SoC target value at each time in a system relating to an embodiment 2 of the present invention.

FIG. 8 is a diagram for describing scheduling of the SoC target value at each time in the system relating to the embodiment 2 of the present invention. A solid line 81 indicates the SoC target value capable of securing the required power amount. In the system of the embodiment 2, in the case that the PV generated power is large as in a period from time A to time B, the SoC target value is set higher than the SoC ideal for suppressing the degradation of the storage battery so as to satisfy the required power amount. In addition, in the case that the PV generated power is small as in periods before the time A and after the time B, the SoC target value is set at the SoC ideal for suppressing the degradation of the storage battery.

Figure 9:
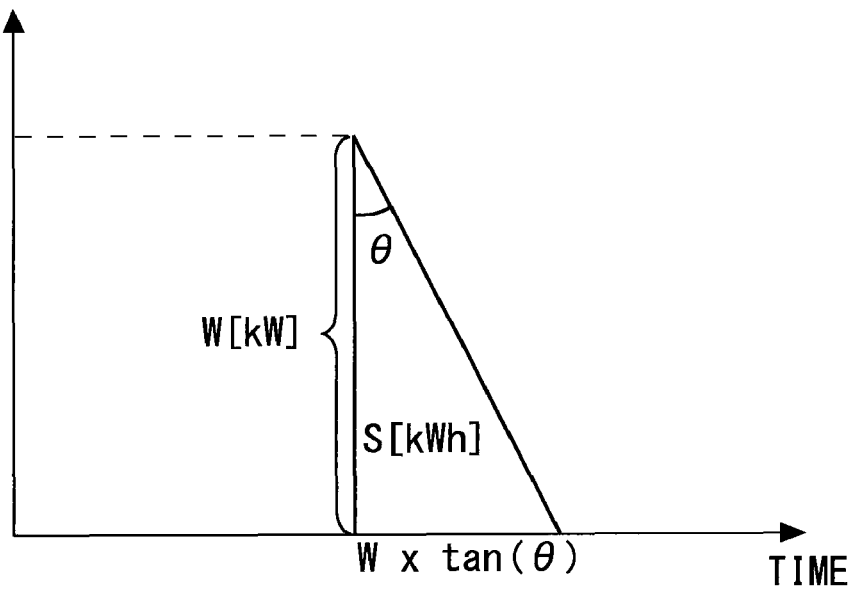
FIG. 9 is a diagram for describing a calculation method of the SoC target value in a period from time A to time B.

FIG. 9 is a diagram for describing a calculation method of the SoC target value in the period from the time A to the time B.

When rated power to be supplied to the power system is defined as P[kW] and a decreasing rate is defined as rated n[%/minute], an inclination θ illustrated in FIG. 9 is the inclination to change from P[kW] to 0 [kW] in 100/(n×60) [h]. That is, $$\tan(\theta)=100/(n\times 60\times P) \qquad (1).$$

When the combined power is defined as W[kW] and the required power amount is defined as S[kWh], it is $$S[kWh] = W \times W \times \tan(\theta) \times 2 \quad (2).$$

When the equation (1) is substituted in the equation (2), it is $$S[kWh] = W \times W \times 100/(n \times 60 \times P \times 2) \quad (3).$$

When a storage battery laded capacity is defined as BT[kWh], the SoC target value[%] indicated by the following equation (4) is desirable at the time of W[kW].

$$\text{SoC target value}[\%] = S \times 100/BT \quad (4)$$

In this way, the SoC target value capable of securing the required power amount can be set from the combined power W[kW].

Figure 10:
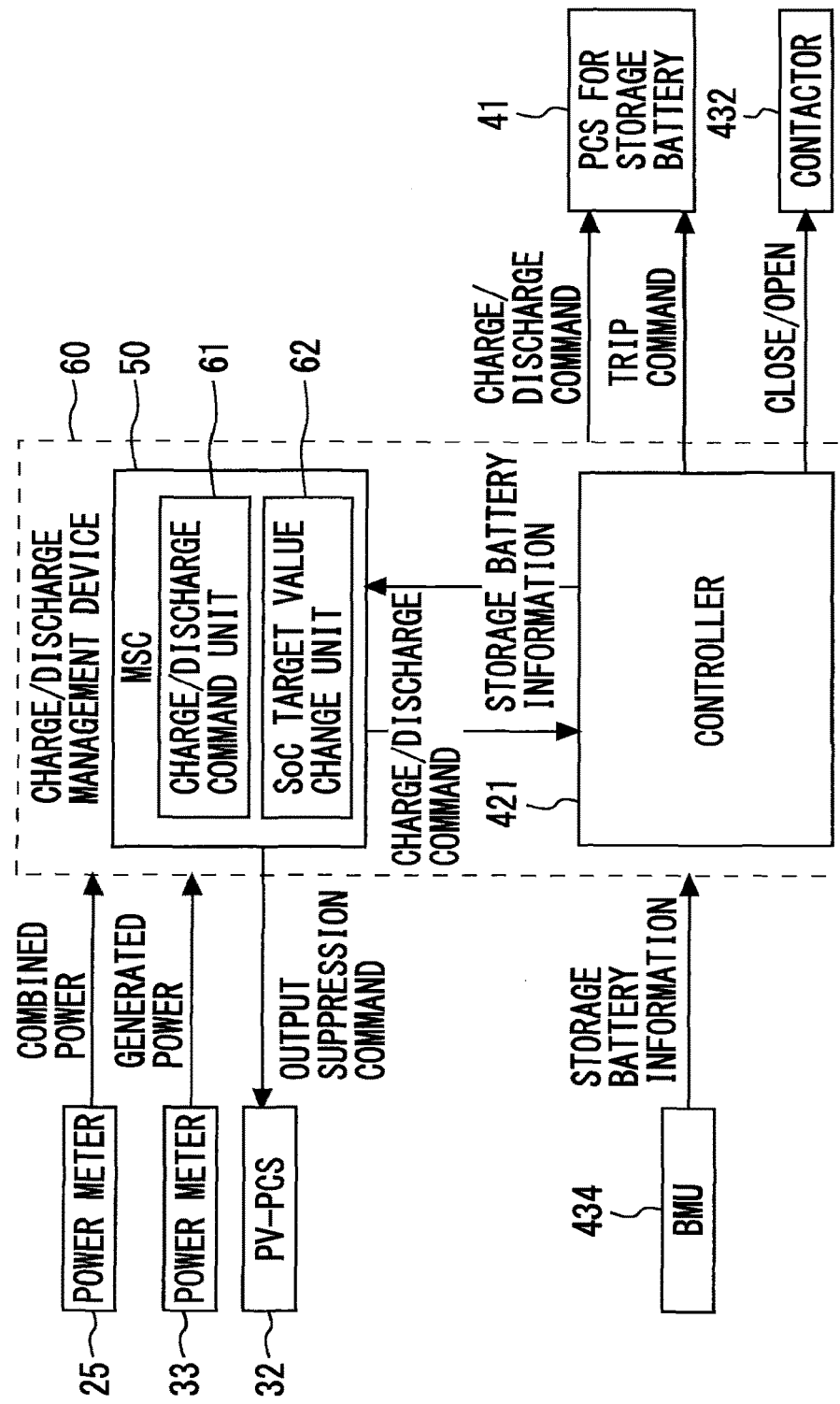
FIG. 10 is a block diagram of the system relating to the embodiment 2 of the present invention.

FIG. 10 is a block diagram of the system relating to the embodiment 2 of the present invention. The configuration illustrated in FIG. 10 is similar to FIG. 2 except for a point that a SoC target value change unit 62 is added to the charge/discharge management device 60. Therefore, the descriptions of the individual units other than the SoC target value change unit 62 are simplified or omitted.

(SoC Target Value Change Function)

The charge/discharge management device 60 has the SoC target value change function, and the SoC target value change unit 62 is in charge of the function. The SoC target value change unit 62 changes the SoC target value according to the change of the required power amount based on the change of the combined power. Note that the combined power is detected by the power meter 25. In addition, the combined power may be calculated by adding the generated power of the power generation system 30 detected by the power meter 33 and the charge/discharge power of the storage battery system 40 together by the main site controller 50.

Specifically, the SoC target value change unit 62 sets the SoC target value computed from the combined power W[kW] at the target value for securing the required power amount capable of continuing the discharge until the power supplied to the power system becomes 0 without letting the system supply power change rate become below –n %, in the case of assuming that the generated power by the power generation system 30 becomes 0 at each time. The equations (1)-(4) described above are used to calculate the SoC target value. In addition, in the case that the required power amount is lower than the ideal value suitable for suppressing the degradation of the storage battery module 433, the SoC target value is set at the ideal value suitable for suppressing the degradation of the storage battery module 433.

The charge/discharge command unit 61 performs the processing described in the description of the charge/discharge command function in the embodiment 1, using the SoC target value calculated on the basis of the combined power at each time by the SoC target value change unit 62.

(Flowchart)

Figure 11:
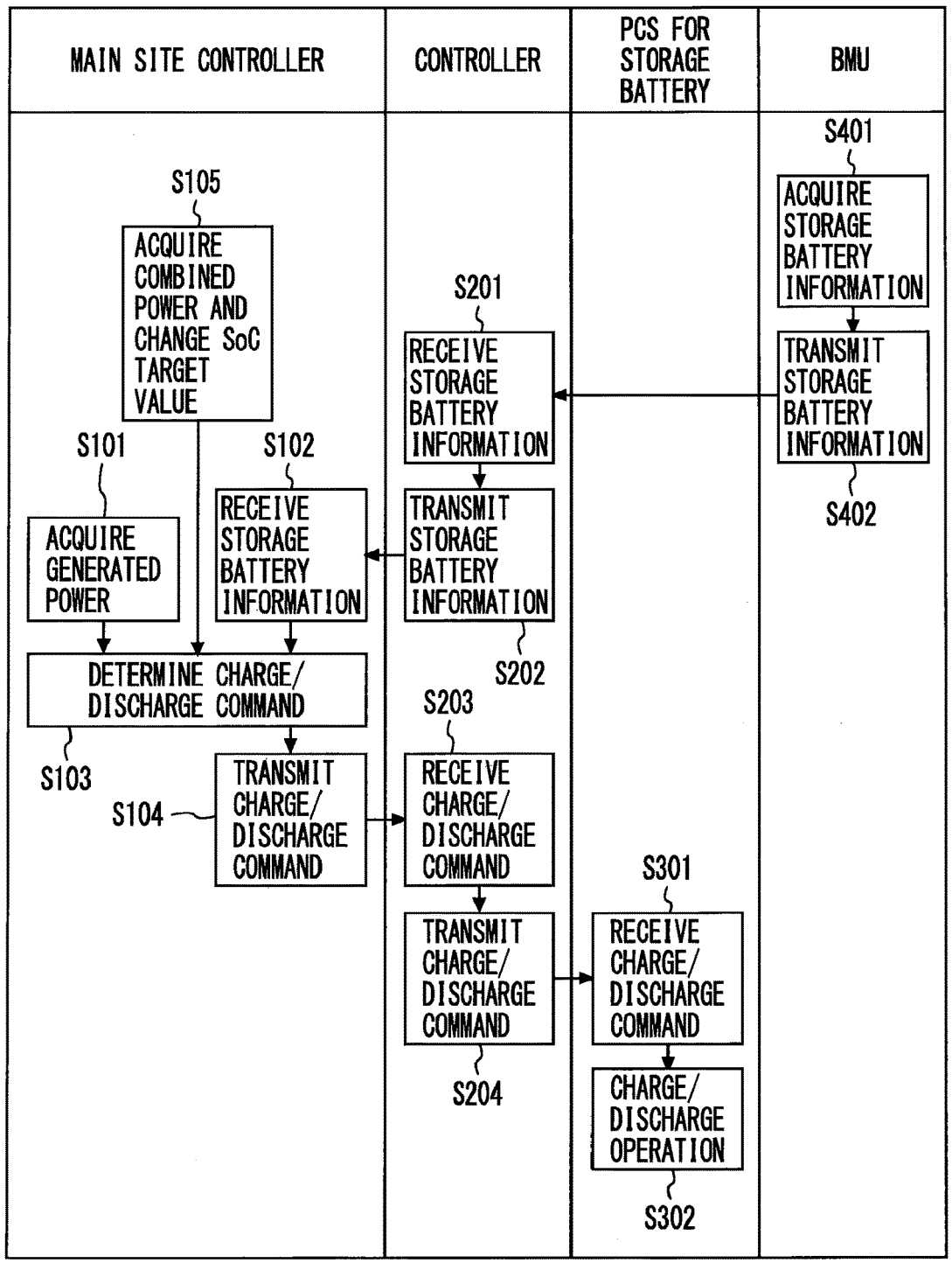
FIG. 11 is a flowchart of the control routine executed by the charge/discharge management device 60, in the system relating to the embodiment 2 of the present invention.

FIG. 11 is a flowchart of the control routine executed by the charge/discharge management device 60, in the system relating to the embodiment 2 of the present invention. The processing of the main site controller 50 illustrated in the flowchart is the processing realized by the individual functions of the charge/discharge command unit 61 and the SoC target value change unit 62. The program that executes the processing in the flowchart illustrated in FIG. 11 is stored in the memory of the main site controller 50, and by reading and executing the program by the processor of the main site controller 50, the processing illustrated in FIG. 11 is realized.

The routine illustrated in FIG. 11 is similar to the routine illustrated in FIG. 4, except for the point that the processing of step S105 is added as preprocessing of step S103. Hereinafter, in FIG. 11, for the steps same as the steps illustrated in FIG. 4, the same signs are attached and the descriptions are omitted.

In step S105, the main site controller 50 first acquires the combined power value from the power meter 25 in the predetermined short cycle (for example, the interval of several tens of milliseconds). Next, the SoC target value change unit 62 calculates the SoC target value on the basis of the acquired combined power value, and sets it as a new SoC target value. The processing executed in step S105 is as described in the description of the SoC target value change function. The SoC target value set in step S105 at each time is used in the processing of step S103.

As described above, the charge/discharge management device 60 of the present embodiment sets the SoC target value higher than the ideal value suitable for suppressing the degradation of the storage battery module 433 in the daytime when the required power amount is large, and sets the SoC target value at the ideal value suitable for suppressing the degradation of the storage battery module 433 in the morning and evening when the required power amount is small. Thus, according to the charge/discharge management device 60 of the present embodiment, the SoC target value can be changed according to the change of the required power amount based on the change of the combined power, and the storage battery can be efficiently operated.

Embodiment 3

[Entire Configuration of Embodiment 3]

Next, the embodiment 3 of the present invention will be described with reference to FIG. 12 to FIG. 14. The system of the present embodiment can be realized by making the charge/discharge management device 60 execute the routine in FIG. 14 to be described later, in the configuration illustrated in FIG. 1 and FIG. 13.

[Characteristic Control in Embodiment 3]

In the above-described embodiment 2, the SoC target value is changed at each time, paying attention to the fact that the required power amount increases in the daytime compared to the morning and evening. Now, the output of the photovoltaic power generation system tends to increase in a period from the sunrise time to the solar radiation peak time. Therefore, while it is easy to achieve the SoC target value by positively performing the charge in the case that the SoC of the storage battery is lower than the SoC target value, it is difficult to achieve the SoC target value since a discharge amount is limited in the case that the SoC is higher than the SoC target value. In addition, the output of the photovoltaic power generation system tends to decrease after the solar radiation peak time. Therefore, while it is easy to achieve the SoC target value by positively performing the discharge in the case that the SoC of the storage battery is higher than the SoC target value, it is difficult to achieve the SoC target value since the output tends to decrease in the case that the SoC is lower than the SoC target value. Therefore, it is desirable to schedule the SoC target value in consideration of output tendency of the photovoltaic power generation system.

Figure 12:
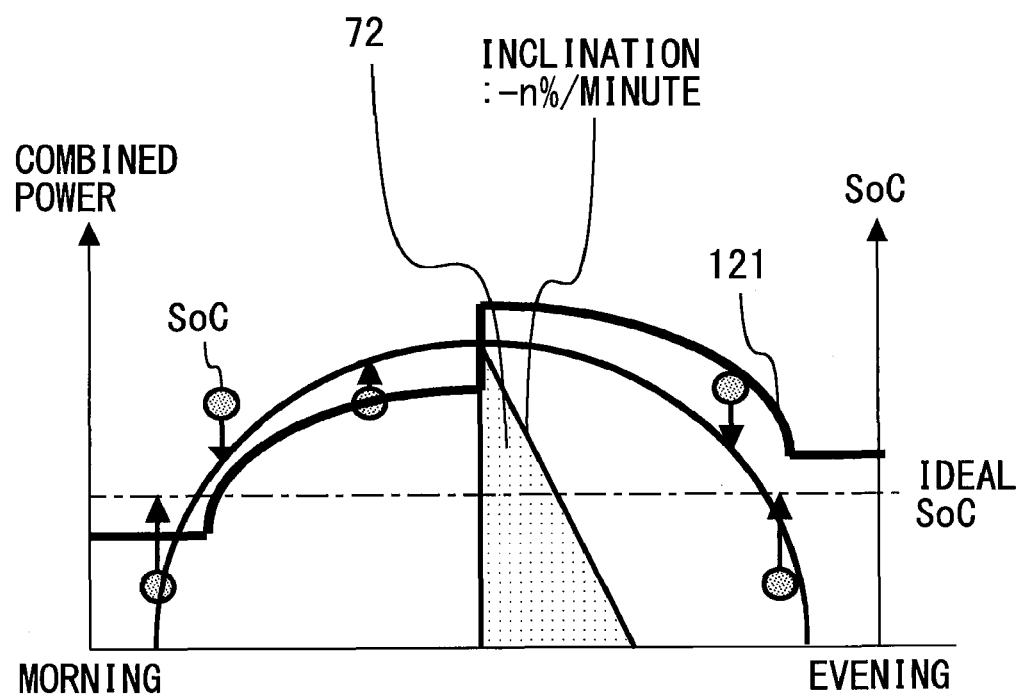
FIG. 12 is a diagram for describing scheduling of the SoC target value in a system relating to an embodiment 3 of the present invention.

FIG. 12 is a diagram for describing scheduling of the SoC target value in the system relating to the embodiment 3 of the present invention. A solid line 121 is the SoC target value at each time in consideration of an offset. For the SoC target value indicated by the solid line 121, a negative offset until the solar radiation peak and a positive offset after the solar radiation peak are taken into consideration.

Figure 13:
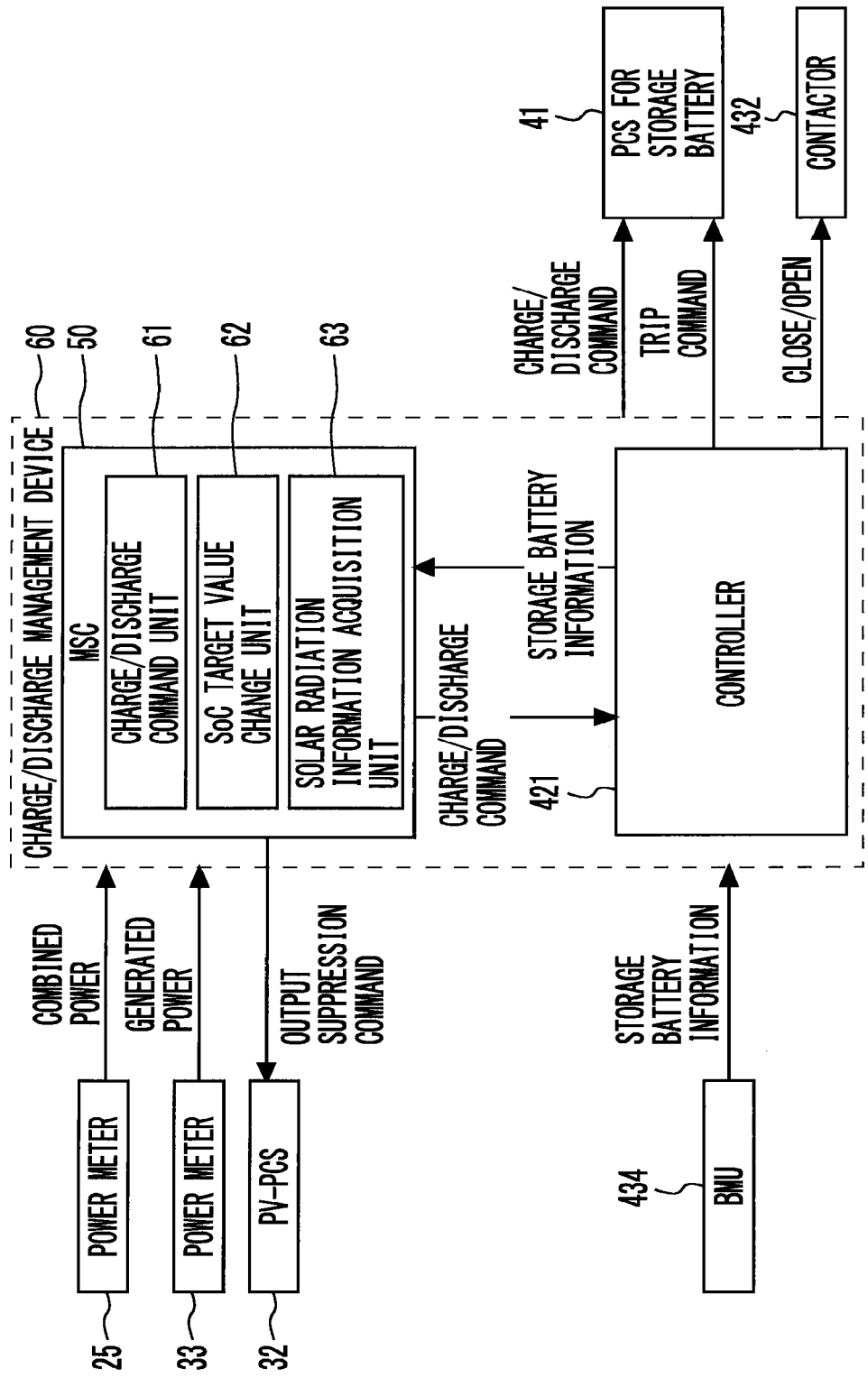
FIG. 13 is a block diagram of the system relating to the embodiment 3 of the present invention.

FIG. 13 is a block diagram of the system relating to the embodiment 3 of the present invention. The configuration illustrated in FIG. 13 is similar to FIG. 10 except for the point that a solar radiation information acquisition unit 63 is added to the charge/discharge management device 60 and the point that the processing of the SoC target value change unit 62 is partially added. Therefore, the descriptions of the individual units other than the SoC target value change unit 62 and the solar radiation information acquisition unit 63 are simplified or omitted.

(Solar Radiation Information Acquisition Function)

The charge/discharge management device 60 has the solar radiation information acquisition function, and the solar radiation information acquisition unit 63 is in charge of the function. The solar radiation information acquisition unit 63 acquires solar radiation information from another computer connected to the computer network 22 or an external storage device connected to the charge/discharge management device 60 or the like. The solar radiation information includes the sunrise time, the solar radiation peak time, the sunset time, and the sunrise time of the next day.

(SoC Target Value Change Function)

The charge/discharge management device 60 has the SoC target value change function, and the SoC target value change unit 62 is in charge of the function. The SoC target value change unit 62 first sets the SoC target value of each time according to the description of the SoC target value change function described in the embodiment 2. In the embodiment 3, an offset value is taken into consideration for the set SoC target value of each time, and the SoC target value of each time is reset. The offset value of each time is set on the basis of the solar radiation information. From the sunrise time to the solar radiation peak time, a negative offset value is added to the SoC target value to attain the SoC target value after resetting. From the solar radiation peak time to the sunset time, a positive offset value is added to the SoC target value to attain the SoC target value after resetting.

The charge/discharge command unit 61 performs the processing described in the description of the charge/discharge command function in the embodiment 1, using the SoC target value of each time reset by the SoC target value change unit 62.

(Flowchart)

Figure 14:
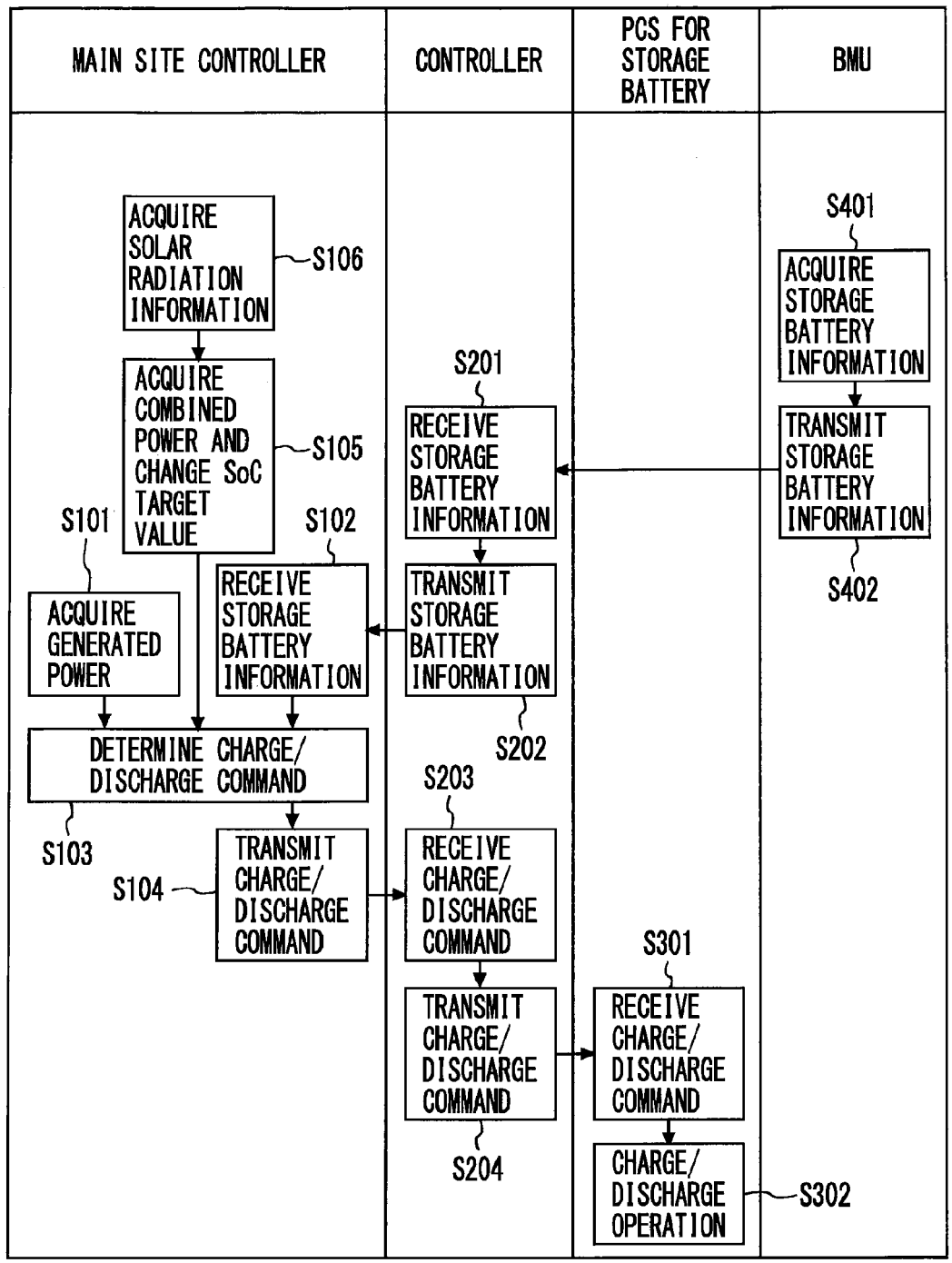
FIG. 14 is a flowchart of the control routine executed by the charge/discharge management device 60, in the system relating to the embodiment 3 of the present invention.

FIG. 14 is a flowchart of the control routine executed by the charge/discharge management device 60, in the system relating to the embodiment 3 of the present invention. The processing of the main site controller 50 illustrated in the flowchart is the processing realized by the individual functions of the charge/discharge command unit 61, the SoC target value change unit 62, and the solar radiation information acquisition unit 63. The program that executes the processing in the flowchart illustrated in FIG. 14 is stored in the memory of the main site controller 50, and by reading and executing the program by the processor of the main site controller 50, the processing illustrated in FIG. 14 is realized.

The routine illustrated in FIG. 14 is similar to the routine illustrated in FIG. 11, except for the point that the processing of step S106 is added as the preprocessing of step S105. Hereinafter, in FIG. 14, for the steps same as the steps illustrated in FIG. 4 and FIG. 11, the same signs are attached and the descriptions are omitted.

In step S106, the solar radiation information acquisition unit 63 acquires the solar radiation information from another computer connected to the computer network 22 or an external storage device connected to the charge/discharge management device 60 or the like.

After the processing of step S106, in step S105, the SoC target value change unit 62 sets the SoC target value at each time. The processing executed in step S105 is as described in the description of the SoC target value change function. The SoC target value reset in step S105 is used in the processing of step S103.

As described above, the charge/discharge management device 60 of the present embodiment schedules the SoC target value in consideration of the output tendency of the photovoltaic power generation system. Thus, according to the charge/discharge management device 60 of the present embodiment, the SoC of the storage battery module 433 is easily controlled to the SoC target value throughout the day.

(Modification)

Now, in the system of the embodiment 3 described above, there may be the time when the offset value is 0. Further, since the solar radiation information changes for each season, the SoC target value and the offset value may be changed depending on dates. Further, the offset value may be automatically calculated by automatically predicting PV power generation tendency from a weather forecast and the solar radiation information.

Embodiment 4

[Entire Configuration of Embodiment 4]

Next, the embodiment 4 of the present invention will be described with reference to FIG. 13 and FIG. 14. The system of the present embodiment can be realized by making the charge/discharge management device 60 execute the routine in FIG. 14 to be described later, in the configuration illustrated in FIG. 1 and FIG. 13.

[Characteristic Control in Embodiment 4]

In the above-described embodiment 2, the SoC target value is changed at each time, paying attention to the fact that the required power amount increases in the daytime compared to the morning and evening. Now, the SoC of the storage battery at the sunset time is sometimes different from the ideal value suitable for suppressing the degradation. Therefore, in the system of the embodiment 4, in the case that the generated power by the photovoltaic power generation system is 0 and it is past the sunset time, the SoC target value is set at the ideal value suitable for suppressing the degradation.

FIG. 13 is a block diagram of the system relating to the embodiment 4 of the present invention. The configuration illustrated in FIG. 13 is similar to FIG. 10 except for the point that the solar radiation information acquisition unit 63 is added to the charge/discharge management device 60 and the point that the processing of the SoC target value change unit 62 is partially added. Therefore, the descriptions of the individual units other than the SoC target value change unit 62 and the solar radiation information acquisition unit 63 are simplified or omitted.

(Solar Radiation Information Acquisition Function)

The charge/discharge management device 60 has the solar radiation information acquisition function, and the solar radiation information acquisition unit 63 is in charge of the function. The solar radiation information acquisition unit 63 acquires annual solar radiation information from another computer connected to the computer network 22 or an external storage device connected to the charge/discharge management device 60 or the like. The solar radiation information includes the sunrise time, the solar radiation peak time, the sunset time, and the sunrise time of the next day.

(SoC Target Value Change Function)

The charge/discharge management device 60 has the SoC target value change function, and the SoC target value change unit 62 is in charge of the function. In the case that the generated power by the photovoltaic power generation system is 0 and it is past the sunset time, the SoC target value change unit 62 sets the SoC target value at the ideal value suitable for suppressing the degradation of the storage battery module 433. Note that, for the setting of the SoC target value from the sunrise time to the sunset time, it may be a fixed value, or the SoC target value of each time may be set according to the description of the SoC target value change function described in the embodiment 2.

The charge/discharge command unit 61 performs the processing described in the description of the charge/discharge command function in the embodiment 1, using the SoC target value set by the SoC target value change unit 62. Since the generated power by the photovoltaic power generation system is 0 after the sunset time, in the case that the SoC of the storage battery module 433 is lower than the SoC target value, the storage battery module 433 may perform the charge by power reception from other power generation equipment connected to an electric system. On the other hand, in the case that the SoC of the storage battery module 433 is higher than the SoC target value, excess power is discharged from the storage battery module 433.

(Flowchart)

FIG. 14 is the flowchart of the control routine executed by the charge/discharge management device 60, in the system relating to the embodiment 4 of the present invention. The processing of the main site controller 50 illustrated in the flowchart is the processing realized by the individual functions of the charge/discharge command unit 61, the SoC target value change unit 62, and the solar radiation information acquisition unit 63. The program that executes the processing in the flowchart illustrated in FIG. 14 is stored in the memory of the main site controller 50, and by reading and executing the program by the processor of the main site controller 50, the processing illustrated in FIG. 14 is realized.

The routine illustrated in FIG. 14 is similar to the routine illustrated in FIG. 11, except for the point that the processing of step S106 is added as the preprocessing of step S105. Hereinafter, in FIG. 14, for the steps same as the steps illustrated in FIG. 4 and FIG. 11, the same signs are attached and the descriptions are omitted.

In step S106, the solar radiation information acquisition unit 63 acquires the solar radiation information from another computer connected to the computer network 22 or an external storage device connected to the charge/discharge management device 60 or the like.

After the processing of step S106, in step S105, the SoC target value change unit 62 sets the SoC target value at the ideal value suitable for suppressing the degradation of the storage battery module 433, in the case that the generated power by the photovoltaic power generation system is 0 and it is past the sunset time. The processing executed in step S105 is as described in the description of the SoC target value change function. The SoC target value set in step S105 is used in the processing of step S103.

As described above, the charge/discharge management device 60 of the present embodiment can control the SoC of the storage battery module 433 to the ideal value suitable for suppressing the degradation, in a period during which the storage battery module 433 is not used for suppressing the fluctuation of the generated power. Thus, according to the charge/discharge management device 60 of the present embodiment, the degradation of the storage battery module 433 is suppressed, and the performance and the service life can be maintained.

(Modification 1)

Now, in the system of the above-described embodiment 4, in the case that the SoC of the storage battery module 433 is lower than the SoC target value after the sunset time, the power is supplied from the power system and the charge is performed. However, the power reception from the power system is sometimes inhibited by an agreement with an electric power company or the like or sometimes causes demerits in terms of costs. Then, the SoC target value change unit 62 may set the SoC target value higher than the ideal value suitable for suppressing the degradation of the storage battery module 433 before the sunset time. By such setting, the SoC of the storage battery module 433 can be made to coincide with the SoC target value just by the discharge after the sunset time.

(Modification 2)

In addition, in the system of the above-described embodiment 4, the SoC target value is set at the ideal value suitable for suppressing the degradation of the storage battery module 433 from the sunset time to the sunrise time of the next day. However, the generated power of the photovoltaic power generation system tends to increase after the sunrise time, and when the storage battery module 433 is turned to a full charge state, the output fluctuation of the photovoltaic power generation cannot be leveled by the charge. In this case, the generated power by the photovoltaic power generation system needs to be suppressed. Therefore, it is desirable that the SoC of the storage battery module 433 at the sunrise time is in the vicinity of 0. Then, the SoC target value change unit 62 may lower the SoC target value stepwise to the vicinity of 0 in the period from the sunset time to the sunrise time of the next day. By such setting, the discharge is performed in the night, and the SoC of the storage battery module 433 at the sunrise time can be made to approach 0.

Embodiment 5

[Entire Configuration of Embodiment 5]

Next, the embodiment 5 of the present invention will be described with reference to FIG. 15 and FIG. 16. The system of the present embodiment can be realized by making the charge/discharge management device 60 execute the routine in FIG. 16 to be described later, in the configuration illustrated in FIG. 1 and FIG. 15.

[Characteristic Control in Embodiment 5]

In the configuration of the modification 2 of the above-described embodiment 4, the SoC of the storage battery module 433 at the sunrise time of the next day is in the vicinity of 0. However, in the case that the weather of the next day is rain or snow or the like, the charge to the storage battery module 433 cannot be performed. Therefore, in the system of the embodiment 5, weather forecast information is acquired, and in the case that the weather forecast of the next day is the weather not suitable for the power generation, the SoC target value is not lowered in the period from the sunset time to the sunrise time of the next day.

Figure 15:
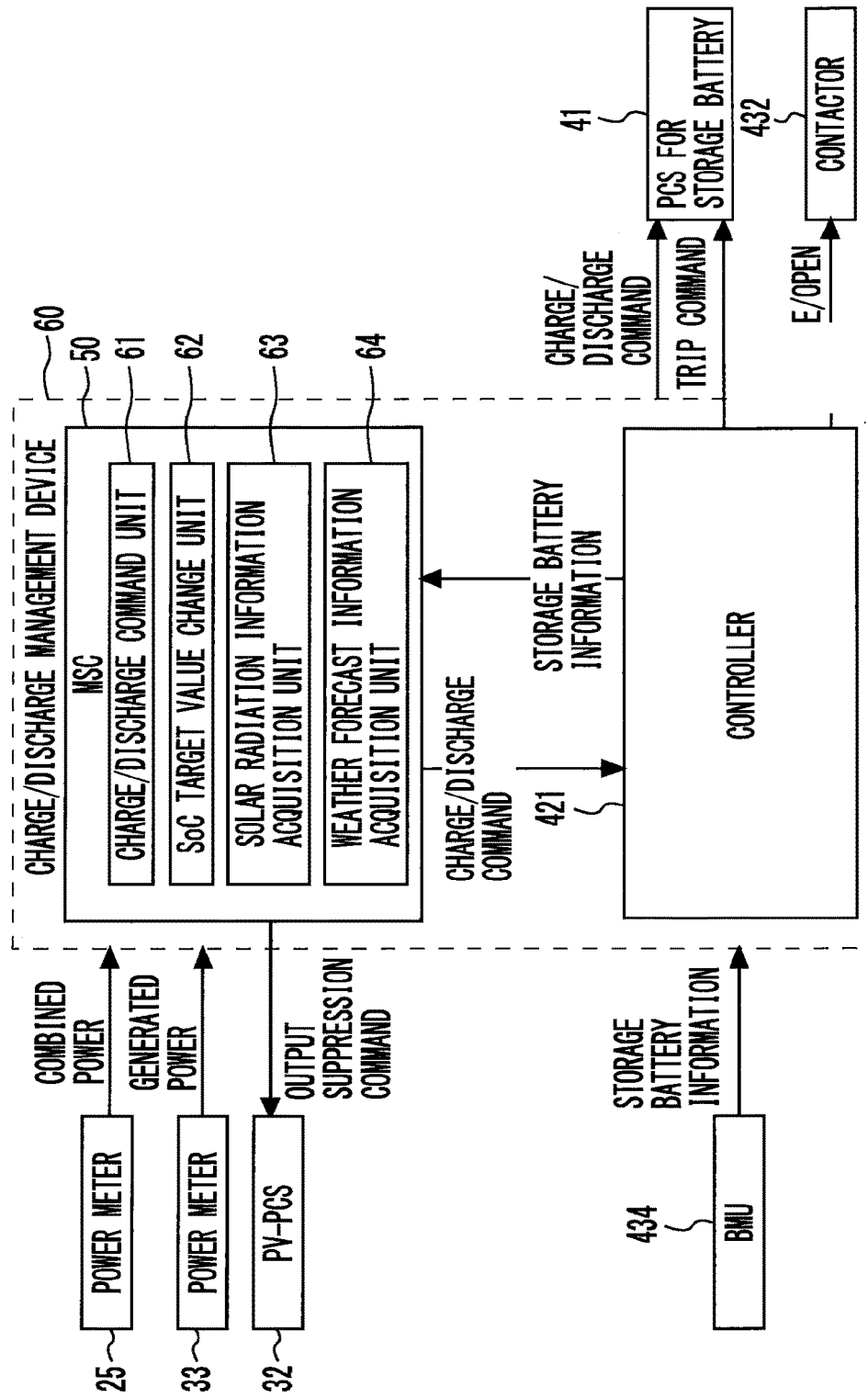
FIG. 15 is a block diagram of a system relating to an embodiment 5 of the present invention.

FIG. 15 is a block diagram of the system relating to the embodiment 5 of the present invention. The configuration illustrated in FIG. 15 is similar to FIG. 13 except for the point that a weather forecast information acquisition unit 64 is added to the charge/discharge management device 60 and the point that the processing of the SoC target value change unit 62 is partially added. Therefore, the descriptions of the individual units other than the SoC target value change unit 62 and the weather forecast information acquisition unit 64 are simplified or omitted.

(Weather Forecast Information Acquisition Function)

The charge/discharge management device 60 has the weather forecast information acquisition function, and the weather forecast information acquisition unit 64 is in charge of the function. The weather forecast information acquisition unit 64 acquires the weather forecast information from another computer connected to the computer network 22 or an external storage device connected to the charge/discharge management device 60 or the like. The weather forecast information includes the weather forecast of each time.

(SoC Target Value Change Function)

The charge/discharge management device 60 has the SoC target value change function, and the SoC target value change unit 62 is in charge of the function. In the case that the generated power by the photovoltaic power generation system is 0 and it is past the sunset time, the SoC target value change unit 62 sets the SoC target value at the ideal value suitable for suppressing the degradation of the storage battery module 433. In addition, in the case that the weather forecast of the next day based on the weather forecast information is the weather suitable for the power generation, the SoC target value change unit 62 lowers the SoC target value stepwise to the vicinity of 0 in the period from the sunset time to the sunrise time of the next day. In addition, in the case that the weather forecast of the next day based on the weather forecast information is the weather not suitable for the power generation, the SoC target value change unit 62 does not lower the SoC target value in the period from the sunset time to the sunrise time of the next day. Note that, for the setting of the SoC target value from the sunrise time to the sunset time, it may be a fixed value, or the SoC target value of each time may be set according to the description of the SoC target value change function described in the embodiment 2.

The charge/discharge command unit 61 performs the processing described in the description of the charge/discharge command function in the embodiment 1, using the SoC target value set by the SoC target value change unit 62.

(Flowchart)

Figure 16:
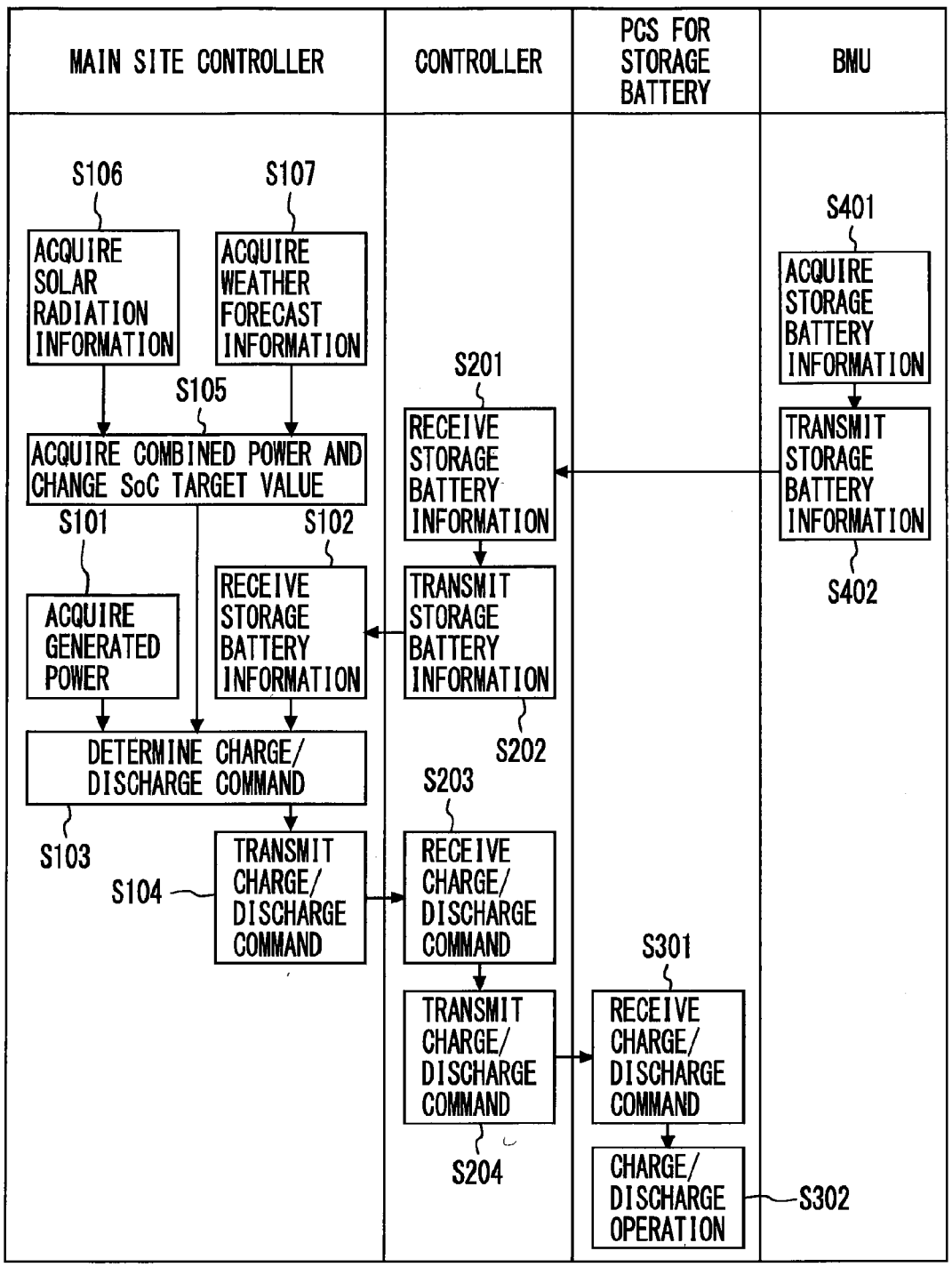
FIG. 16 is a flowchart of the control routine executed by the charge/discharge management device 60, in the system relating to the embodiment 5 of the present invention.

FIG. 16 is a flowchart of the control routine executed by the charge/discharge management device 60, in the system relating to the embodiment 5 of the present invention. The processing of the main site controller 50 illustrated in the flowchart is the processing realized by the individual functions of the charge/discharge command unit 61, the SoC target value change unit 62, the solar radiation information acquisition unit 63, and the weather forecast information acquisition unit 64. The program that executes the processing in the flowchart illustrated in FIG. 16 is stored in the memory of the main site controller 50, and by reading and executing the program by the processor of the main site controller 50, the processing illustrated in FIG. 16 is realized.

The routine illustrated in FIG. 16 is similar to the routine illustrated in FIG. 14, except for the point that the processing of step S107 is added as the preprocessing of step S105. Hereinafter, in FIG. 16, for the steps same as the steps illustrated in FIG. 4, FIG. 11 and FIG. 14, the same signs are attached and the descriptions are omitted.

In step S106, the solar radiation information acquisition unit 63 acquires the solar radiation information from another computer connected to the computer network 22 or an external storage device connected to the charge/discharge management device 60 or the like. In addition, in step S107, the weather forecast information acquisition unit 64 acquires the weather forecast information from another computer connected to the computer network 22 or an external storage device connected to the charge/discharge management device 60 or the like.

After the processing of step S106 and step S107, in step S105, the SoC target value change unit 62 sets the SoC target value at each time. The processing executed in step S105 is as described in the description of the SoC target value change unit. The SoC target value set in step S105 is used in the processing of step S103.

As described above, in the case that the weather forecast of the next day based on the weather forecast information is the weather not suitable for the power generation, the charge/discharge management device 60 of the present embodiment does not lower the SoC target value in the period from the sunset time to the sunrise time of the next day. Therefore, the SoC of the storage battery module 433 is not lowered by the next morning, the output fluctuation of the photovoltaic power generation of the next day can be leveled by the charge/discharge control of the storage battery.

REFERENCE SIGNS LIST

10 Power generation equipment
20 Power transmission facility
21 Intra-equipment electric wire
22, 23, 24 Computer network
30 Power generation system
31 Photovoltaic power generation module
32 PV-PCS
33 Power meter
40 Storage battery system
41 PCS for storage battery
42 FBCS board
43 Storage battery board
50 Main site controller
60 Charge/discharge management device
61 Charge/discharge command unit
62 SoC target value change unit
63 Solar radiation information acquisition unit
64 Weather forecast information acquisition unit
421 Controller
431 Fuse
432 Contactor
433 Storage battery module
434 Battery management unit (BMU)

The invention claimed is:

1. A charge/discharge management device provided in a power generation equipment including a power generation system in which a generated power fluctuates depending on weather and a storage battery system and connected to a power system,
wherein the power generation system includes a power meter that detects the generated power, and
wherein the storage battery system includes
a storage battery,
a battery management unit configured to monitor a state of the storage battery, and
a power conditioning system having a function of converting AC power outputted by the power generation system to DC power and charging the DC power to the storage battery, and a function of converting the DC power of the storage battery to the AC power and discharging the AC power to the power system, the charge/discharge management device comprising a charge/discharge command unit configured to determine charge/discharge commands for the power conditioning system on the basis of the generated power detected by the power meter and storage battery information supplied from the battery management unit, such that a change rate per unit time of a power supplied to the power system to a rated power (hereinafter, described as a system supply power change rate) is within a fluctuation range of ±n %, and an SoC (State of Charge) of the storage battery approaches an SoC target value, wherein the charge/discharge management device further comprises an SoC target value change unit that changes the SoC target value on the basis of combined power for which the generated power of the power generation system and charge/discharge power of the storage battery system are added up, at each time, and wherein the SoC target value change unit sets the SoC target value at each time at a target value for securing the power capable of continuing discharge until the power supplied to the power system becomes 0 without letting the system supply power change rate become below −n %, in the case of assuming that the generated power by the power generation system becomes 0 at each time.

2. The charge/discharge management device according to claim 1, wherein the charge/discharge command unit determines the charge/discharge command to increase charge power or decrease discharge power more than the previous charge/discharge command such that the system supply power change rate is −n % or higher and below 0%, in a case that the SoC is lower than the SoC target value and a change rate per unit time of the generated power detected by the power meter to the rated power is +n % or higher.

3. The charge/discharge management device according to claim 1, wherein the charge/discharge command unit determines the charge/discharge command to increase the discharge power or decrease the charge power more than the previous charge/discharge command such that the system supply power change rate is −n % or higher and below 0%, in the case that the SoC is lower than the SoC target value and a change rate per unit time of the generated power detected by the power meter to the rated power is −n % or lower.

4. The charge/discharge management device according to claim 1, wherein the charge/discharge command unit determines the charge/discharge command to increase the charge power or decrease the discharge power more than the previous charge/discharge command such that the system supply power change rate is −n % or higher and below 0%, in the case that the SoC is lower than the SoC target value and a change rate per unit time of the generated power detected by the power meter to the rated power is higher than −n % and lower than +n %.

5. The charge/discharge management device according to claim 1, wherein the charge/discharge command unit determines the charge/discharge command to increase the charge power or decrease the discharge power more than the previous charge/discharge command such that the system supply power change rate is higher than 0% and +n % or lower, in the case that the SoC is higher than the SoC target value and a change rate per unit time of the generated power detected by the power meter to the rated power is +n % or higher.

6. The charge/discharge management device according to claim 1, wherein the charge/discharge command unit determines the charge/discharge command to increase the discharge power or decrease the charge power more than the previous charge/discharge command such that the system supply power change rate is higher than 0% and +n % or lower, in the case that the SoC is higher than the SoC target value and a change rate per unit time of the generated power detected by the power meter to the rated power is −n % or lower.

7. The charge/discharge management device according to claim 1, wherein the charge/discharge command unit determines the charge/discharge command to increase the discharge power or decrease the charge power more than the previous charge/discharge command such that the system supply power change rate is higher than 0% and +n % or lower, in the case that the SoC is higher than the SoC target value and a change rate per unit time of the generated power detected by the power meter to the rated power is higher than −n % and lower than +n %.

8. A charge/discharge management device provided in a power generation equipment including a power generation system in which a generated power fluctuates depending on weather and a storage battery system and connected to a power system, wherein the power generation system includes a power meter that detects the generated power, and wherein the storage battery system includes a storage battery, a battery management unit configured to monitor a state of the storage battery, and a power conditioning system having a function of converting AC power outputted by the power generation system to DC power and charging the DC power to the storage battery, and a function of converting the DC power of the storage battery to the AC power and discharging the AC power to the power system, the charge/discharge management device comprising a charge/discharge command unit configured to determine charge/discharge commands for the power conditioning system on the basis of the generated power detected by the power meter and storage battery information supplied from the battery management unit, such that a change rate per unit time of a power supplied to the power system to a rated power (hereinafter, described as a system supply power change rate) is within a fluctuation range of ±n %, and an SoC (State of Charge) of the storage battery approaches an SoC target value, wherein the charge/discharge management device further comprises an SoC target value change unit that changes the SoC target value on the basis of combined power for which the generated power of the power generation system and charge/discharge power of the storage battery system are added up, at each time, wherein the charge/discharge management device further comprises a solar radiation information acquisition unit that acquires sunrise time, solar radiation peak time and sunset time, and wherein the SoC target value change unit adds a negative offset value to the SoC target value from the sunrise time to the solar radiation peak time, and adds a positive offset value to the SoC target value from the solar radiation peak time to the sunset time.

9. A charge/discharge management device provided in a power generation equipment including a power generation system in which a generated power fluctuates depending on weather and a storage battery system and connected to a power system,
    wherein the power generation system includes a power meter that detects the generated power, and
    wherein the storage battery system includes
    a storage battery,
    a battery management unit configured to monitor a state of the storage battery, and
    a power conditioning system having a function of converting AC power outputted by the power generation system to DC power and charging the DC power to the storage battery, and a function of converting the DC power of the storage battery to the AC power and discharging the AC power to the power system,
    the charge/discharge management device comprising
    a charge/discharge command unit configured to determine charge/discharge commands for the power conditioning system on the basis of the generated power detected by the power meter and storage battery information supplied from the battery management unit, such that a change rate per unit time of a power supplied to the power system to a rated power (hereinafter, described as a system supply power change rate) is within a fluctuation range of ±n %, and an SoC (State of Charge) of the storage battery approaches an SoC target value,
    wherein the charge/discharge management device further comprises an SoC target value change unit that changes the SoC target value on the basis of combined power for which the generated power of the power generation system and charge/discharge power of the storage battery system are added up, at each time,
    wherein the charge/discharge management device further comprises a solar radiation information acquisition unit that acquires sunrise time, solar radiation peak time and sunset time, and
    wherein the SoC target value change unit sets the SoC target value at an ideal value suitable for suppressing degradation of the storage battery in the case that the generated power by the power generation system is 0, and in the case that it is past the sunset time.

10. The charge/discharge management device according to claim 9,
    wherein the SoC target value change unit sets the SoC target value higher than the ideal value before the sunset time.

11. The charge/discharge management device according to claim 9,
    wherein the SoC target value change unit lowers the SoC target value stepwise to a vicinity of 0, in a period from the sunset time to the sunrise time of a next day.

12. The charge/discharge management device according to claim 11,
    wherein the charge/discharge management device further comprises a weather forecast information acquisition unit that acquires weather forecast information, and
    wherein the SoC target value change unit does not lower the SoC target value in the period from the sunset time to the sunrise time of the next day, in the case that a weather forecast of the next day based on the weather forecast information is the weather not suitable for power generation.

* * * * *